US 11,300,187 B2

(12) United States Patent
Zhu et al.

(10) Patent No.: US 11,300,187 B2
(45) Date of Patent: Apr. 12, 2022

(54) HYDRO-MECHANICAL HYBRID TRANSMISSION DEVICE WITH TWO HYDRAULIC TRANSMISSION MECHANISMS

(71) Applicant: JIANGSU UNIVERSITY, Zhenjiang (CN)

(72) Inventors: Zhen Zhu, Zhenjiang (CN); Long Chen, Zhenjiang (CN); Yingfeng Cai, Zhenjiang (CN); Changgao Xia, Zhenjiang (CN); Rong Zou, Zhenjiang (CN); Lingxin Zeng, Zhenjiang (CN); Yulin Deng, Zhenjiang (CN); Shaohua Wang, Zhenjiang (CN); Xing Xu, Zhenjiang (CN); Dehua Shi, Zhenjiang (CN)

(73) Assignee: JIANGSU UNIVERSITY, Zhenjiang (CN)

(*) Notice: Subject to any disclaimer, the term of this patent is extended or adjusted under 35 U.S.C. 154(b) by 0 days.

(21) Appl. No.: 17/426,660

(22) PCT Filed: Aug. 14, 2020

(86) PCT No.: PCT/CN2020/109156
§ 371 (c)(1),
(2) Date: Jul. 29, 2021

(87) PCT Pub. No.: WO2022/027725
PCT Pub. Date: Feb. 10, 2022

(65) Prior Publication Data
US 2022/0042586 A1 Feb. 10, 2022

(30) Foreign Application Priority Data

Aug. 3, 2020 (CN) .......................... 202010766110.4

(51) Int. Cl.
*F16H 47/04* (2006.01)
*F16H 47/06* (2006.01)
(Continued)

(52) U.S. Cl.
CPC ............. *F16H 47/04* (2013.01); *F16H 39/00* (2013.01); *F16H 41/22* (2013.01); *F16H 47/06* (2013.01);
(Continued)

(58) Field of Classification Search
None
See application file for complete search history.

(56) References Cited

U.S. PATENT DOCUMENTS 4,347,044 A 8/1982 Ahlen et al.
5,890,981 A 4/1999 Coutant et al.
(Continued)

FOREIGN PATENT DOCUMENTS

CN 204496333 U 7/2015
CN 105114588 A 12/2015
CN 111306279 A 6/2020

*Primary Examiner* — Colby M Hansen
(74) *Attorney, Agent, or Firm* — Bayramoglu Law Offices LLC

(57) ABSTRACT

A hydro-mechanical hybrid transmission device with two hydraulic transmission mechanisms includes an input member, a second hydraulic transmission mechanism, a rear planetary gear mechanism, an output member, a first hydraulic transmission mechanism, a front planetary gear mechanism, a clutch assembly, and a brake assembly. The clutch assembly connects the input member to the front planetary gear mechanism, the second hydraulic transmission mechanism, and the first hydraulic transmission mechanism, connects an output end of the first hydraulic transmission mechanism to the front planetary gear mechanism, connects the rear planetary gear mechanism to an output end of the second hydraulic transmission mechanism and the front (Continued)

planetary gear mechanism, and connects the rear planetary gear mechanism to the output member. The clutch assembly and the brake assembly provide a continuous transmission ratio between the input member and the output member.

10 Claims, 18 Drawing Sheets

(51) Int. Cl.
  *F16H 47/10* (2006.01)
  *F16H 41/22* (2006.01)
  *F16H 47/08* (2006.01)
  *F16H 39/00* (2006.01)
  *F16H 37/08* (2006.01)

(52) U.S. Cl.
  CPC ........... *F16H 47/085* (2013.01); *F16H 47/10* (2013.01); *F16H 2037/0886* (2013.01); *F16H 2039/005* (2013.01); *F16H 2047/045* (2013.01); *F16H 2200/201* (2013.01); *F16H 2200/2007* (2013.01)

(56) References Cited

U.S. PATENT DOCUMENTS

| | | | | |
|---|---|---|---|---|
| 2010/0184551 | A1* | 7/2010 | Hiraoka | F16H 47/04 475/80 |
| 2012/0152056 | A1* | 6/2012 | Du | F16H 61/448 74/731.1 |
| 2016/0146337 | A1* | 5/2016 | Naito | F16H 61/0265 475/116 |
| 2016/0237651 | A1* | 8/2016 | Miyamoto | B60W 30/182 |
| 2017/0328453 | A1* | 11/2017 | McKinzie | F16H 3/728 |

* cited by examiner

HYDRO-MECHANICAL HYBRID TRANSMISSION DEVICE WITH TWO HYDRAULIC TRANSMISSION MECHANISMS

CROSS REFERENCE TO THE RELATED APPLICATIONS

This application is the national phase entry of International Application No. PCT/CN2020/109156, filed on Aug. 14, 2020, which is based upon and claims priority to Chinese Patent Application No. 202010766110.4, filed on Aug. 3, 2020, the entire contents of which are incorporated herein by reference.

TECHNICAL FIELD

The present invention relates to the field of variable-speed transmission, and in particular, to a hydro-mechanical hybrid transmission device with two hydraulic transmission mechanisms.

BACKGROUND

A hydro-mechanical hybrid transmission device generally adopts hydraulic transmission for startup, hydro-mechanical transmission for operation, and mechanical transmission for transfer, so as to meet the speed regulation requirements of different working conditions within the entire speed regulation range. Due to low efficiency and easy failure of a hydraulic transmission mechanism, the advantages of such a hybrid transmission device in speed regulation range and speed regulation efficiency cannot be realized at the same time. Theoretically, the power transmission capacity becomes stronger with the increase of the power of the hydraulic transmission mechanism; however, the power of the hydraulic transmission mechanism is limited because of the impacts from the manufacturing technology and the production cost. The overall efficiency of the hydraulic transmission mechanism is not high and the range of the high-efficiency zone is narrow, making it difficult to realize efficient speed variation within a large speed regulation range. The main parameters of a single hydraulic transmission mechanism are pressure, rotation speed, displacement, flow, and so on which are related to each other and have limited degree of freedom in adjustment.

SUMMARY

To eliminate the defects in the prior art, the present invention provides a hydro-mechanical hybrid transmission device with two hydraulic transmission mechanisms. The two sets of hydraulic transmission mechanisms can be used separately or in combination to implement switching between hydraulic transmission, hydro-mechanical transmission, and mechanical transmission. Therefore, besides increasing the fault tolerance of the system, the present invention increases the degree of freedom in adjustment, expands the speed regulation range, and improves the transmission efficiency.

The present invention achieves the above objective through the following technical solution.

A hydro-mechanical hybrid transmission device with two hydraulic transmission mechanisms includes an input member, a second hydraulic transmission mechanism, a rear planetary gear mechanism, an output member, a first hydraulic transmission mechanism, a front planetary gear mechanism, a clutch assembly, and a brake assembly, wherein the clutch assembly connects the input member to the front planetary gear mechanism, the second hydraulic transmission mechanism, and the first hydraulic transmission mechanism, connects an output end of the first hydraulic transmission mechanism to the front planetary gear mechanism, connects the rear planetary gear mechanism to an output end of the second hydraulic transmission mechanism and the front planetary gear mechanism, and connects an output end of the rear planetary gear mechanism to the output member; the clutch assembly and the brake assembly provide a continuous transmission ratio between the input member and the output member.

Further, transmission modes including hydraulic transmission, mechanical transmission, single hydro-mechanical transmission, and dual hydro-mechanical transmission are provided between the input member and the output member by adjusting a displacement ratio of the second hydraulic transmission mechanism and/or the first hydraulic transmission mechanism and selectively controlling engagement of the clutch assembly and the brake assembly.

Further, the front planetary gear mechanism includes a front planetary gear mechanism-sun gear, a front planetary gear mechanism-planet carrier, and a front planetary gear mechanism-ring gear; and the rear planetary gear mechanism includes a rear planetary gear mechanism-ring gear, a rear planetary gear mechanism-planet carrier, and a rear planetary gear mechanism-sun gear;

the clutch assembly includes a clutch $C_1$, a clutch $C_2$, a clutch $C_3$, a clutch $C_4$, a clutch $C_5$, a clutch $C_6$, a clutch $C_7$, a clutch $C_8$, a clutch $C_9$, a clutch $C_{10}$, and a clutch $C_{11}$, wherein the clutch $C_1$ is used for selectively connecting the input member to the front planetary gear mechanism-sun gear to achieve synchronous rotation, the clutch $C_2$ is used for selectively connecting the input member to the front planetary gear mechanism-planet carrier to achieve synchronous rotation, the clutch $C_3$ is used for selectively connecting the input member to an input end of the first hydraulic transmission mechanism to achieve synchronous rotation, the clutch $C_4$ is used for selectively connecting the output end of the first hydraulic transmission mechanism to the front planetary gear mechanism-ring gear to achieve synchronous rotation, the clutch $C_5$ is used for selectively connecting the input member to an input end of the second hydraulic transmission mechanism to achieve synchronous rotation, the clutch $C_6$ is used for selectively connecting the output end of the second hydraulic transmission mechanism to the rear planetary gear mechanism-planet carrier to achieve synchronous rotation, the clutch $C_7$ is used for selectively connecting the output end of the second hydraulic transmission mechanism to the rear planetary gear mechanism-ring gear to achieve synchronous rotation, the clutch $C_8$ is used for selectively connecting the front planetary gear mechanism-sun gear to the rear planetary gear mechanism-sun gear to achieve synchronous rotation, the clutch $C_9$ is used for selectively connecting the front planetary gear mechanism-planet carrier to the rear planetary gear mechanism-sun gear to achieve synchronous rotation, the clutch $C_{10}$ is used for selectively connecting the rear planetary gear mechanism-planet carrier to the output member to achieve synchronous rotation, and the clutch $C_{11}$ is used for selectively connecting the rear planetary gear mechanism-ring gear to the output member to achieve synchronous rotation;

the brake assembly includes a brake $B_1$, a brake $B_2$, and a brake $B_3$, wherein the brake $B_1$ is used for selectively fixing the front planetary gear mechanism-ring gear; the brake $B_2$ is used for selectively fixing the rear planetary gear mechanism-planet carrier; and the brake $B_3$ is used for selectively fixing the rear planetary gear mechanism-ring gear.

Further, first forward or reverse hydraulic transmission is provided between the input member and the output member by adjusting the displacement ratio of the first hydraulic transmission mechanism, engaging the clutch $C_3$, the clutch $C_4$, the clutch $C_8$, and the clutch $C_9$, and selectively engaging the clutch $C_{10}$ and the brake $B_3$ or selectively engaging the clutch $C_{11}$ and the brake $B_2$;

second forward or reverse hydraulic transmission is provided between the input member and the output member by adjusting the displacement ratio of the second hydraulic transmission mechanism, engaging the clutch $C_5$, the clutch $C_7$, and the clutch $C_{11}$, or engaging the clutch $C_5$, the clutch $C_6$, and the clutch $C_{10}$.

Further, different forward mechanical transmissions are provided between the input member and the output member by engaging the clutch $C_{10}$ and the brake $B_3$, selectively engaging the clutch $C_1$, the clutch $C_9$, and the brake $B_1$, or selectively engaging the clutch $C_2$ and the clutch $C_9$, or selectively engaging the clutch $C_1$ and the clutch $C_8$, or selectively engaging the clutch $C_2$, the clutch $C_8$, and the brake $B_1$.

Further, different reverse mechanical transmissions are provided between the input member and the output member by engaging the clutch $C_{11}$ and the brake $B_2$, selectively engaging the clutch $C_1$, the clutch $C_9$, and the brake $B_1$, or selectively engaging the clutch $C_2$ and the clutch $C_9$, or selectively engaging the clutch $C_1$ and the clutch $C_8$, or selectively engaging the clutch $C_2$, the clutch $C_8$, and the brake $B_1$.

Further, different first forward single hydro-mechanical transmissions are provided between the input member and the output member by adjusting the displacement ratio of the first hydraulic transmission mechanism, engaging the clutch $C_3$, the clutch $C_4$, the clutch $C_{10}$, and the brake $B_3$, and selectively engaging the clutch $C_1$ and the clutch $C_9$ or selectively engaging the clutch $C_2$ and the clutch $C_8$;

different first reverse single hydro-mechanical transmissions are provided between the input member and the output member by adjusting the displacement ratio of the first hydraulic transmission mechanism, engaging the clutch $C_3$, the clutch $C_4$, the clutch $C_{11}$, and the brake $B_2$, and selectively engaging the clutch $C_1$ and the clutch $C_9$ or selectively engaging the clutch $C_2$ and the clutch $C_8$.

Further, second forward or reverse single hydro-mechanical transmission is provided between the input member and the output member by adjusting the displacement ratio of the second hydraulic transmission mechanism, engaging the clutch $C_1$, the clutch $C_5$, and the clutch $C_8$, and selectively engaging the clutch $C_7$ and the clutch $C_{10}$ or selectively engaging the clutch $C_{11}$ and the clutch $C_6$.

Further, different forward dual hydro-mechanical transmissions are provided between the input member and the output member by adjusting the displacement ratios of the first hydraulic transmission mechanism and the second hydraulic transmission mechanism, engaging the clutch $C_3$, the clutch $C_4$, the clutch $C_5$, the clutch $C_7$, and the clutch $C_{10}$, and selectively engaging the clutch $C_1$ and the clutch $C_9$ or selectively engaging the clutch $C_2$ and the clutch $C_8$;

different reverse dual hydro-mechanical transmissions are provided between the input member and the output member by adjusting the displacement ratios of the first hydraulic transmission mechanism and the second hydraulic transmission mechanism, engaging the clutch $C_3$, the clutch $C_4$, the clutch $C_5$, the clutch $C_6$, and the clutch $C_{11}$, and selectively engaging the clutch $C_1$ and the clutch $C_9$ or selectively engaging the clutch $C_2$ and the clutch $C_8$.

Further, the hydraulic transmission is configured to be switched to the single hydro-mechanical transmission in a stepless manner; and the single hydro-mechanical transmission is configured to be switched to the dual hydro-mechanical transmission in a stepless manner.

The present invention has the following beneficial effects:

1. The hydro-mechanical hybrid transmission device with two hydraulic transmission mechanisms of the present invention has two sets of relatively independent hydraulic transmission mechanisms, which can implement switching between hydraulic transmission and hydro-mechanical transmission separately, thereby achieving high fault tolerance.

2. In the hydro-mechanical hybrid transmission device with two hydraulic transmission mechanisms of the present invention, the two sets of hydraulic transmission mechanisms can jointly regulate the speed, so that the speed regulation range of the system is expanded, the degree of freedom in adjustment of the system is increased, and the transmission efficiency of the system is improved.

3. The hydro-mechanical hybrid transmission device with two hydraulic transmission mechanisms of the present invention can switch between modes such as hydraulic transmission and mechanical transmission in which the first hydraulic transmission mechanism participates, hydro-mechanical transmission in which the first hydraulic transmission mechanism participates, hydraulic transmission in which the second hydraulic transmission mechanism participates, hydro-mechanical transmission in which the second hydraulic transmission mechanism participates, and hydro-mechanical transmission in which the two hydraulic transmission mechanisms participate, wherein the hydraulic transmission and the hydro-mechanical transmission can realize gear shift without power interruption, and the transmission ratio in each gear of the mechanical transmission is designed reasonably.

4. According to the hydro-mechanical hybrid transmission device with two hydraulic transmission mechanisms of the present invention, the hydro-mechanical hybrid transmission device generally adopts hydraulic transmission for startup, hydro-mechanical transmission for operation, and mechanical transmission for transfer, so as to meet the speed regulation requirements of different working conditions within the entire speed regulation range. Due to low efficiency and easy failure of a hydraulic transmission mechanism, the advantages of such a hybrid transmission device in speed regulation range and speed regulation efficiency cannot be realized at the same time. Therefore, it is an effective way to solve the above problem by adopting a hydro-mechanical hybrid transmission device with two hydraulic transmission mechanisms which can take both fault tolerance and the degree of freedom in adjustment into account.

1. input shaft; 2. mechanical transmission mechanism; 21. mechanical transmission mechanism-front gear pair; 22. mechanical transmission mechanism-rear gear pair; 23. clutch $C_1$; 24. clutch $C_2$; 3. second hydraulic transmission mechanism; 31. second hydraulic transmission mechanism-input gear pair; 32. clutch $C_5$; 33. second pump shaft; 34. two-way pump; 35. second hydraulic transmission mechanism-first output gear pair; 36. second hydraulic transmission mechanism-second output gear pair; 37. clutch $C_6$; 38. clutch $C_7$; 39. second motor shaft; 310. two-way motor; 4. rear planetary gear mechanism; 41. rear planetary gear mechanism-ring gear; 42. rear planetary gear mechanism-planet carrier; 43. rear planetary gear mechanism-sun gear; 44. clutch $C_{10}$; 45. clutch $C_{11}$; 46. brake $B_2$; 47. brake $B_3$; 5. output shaft; 6. first hydraulic transmission mechanism; 61. clutch $C_3$; 62. first hydraulic transmission mechanism-input gear pair; 63. first pump shaft; 64. one-way pump; 65. first hydraulic transmission mechanism-output gear pair; 66. clutch $C_4$; 67. first motor shaft; 68. one-way motor; 7. jackshaft; 8. front planetary gear mechanism; 81. front planetary gear mechanism-sun gear; 82. front planetary gear mechanism-planet carrier; 83. front planetary gear mechanism-ring gear; 84. clutch $C_8$; 85. clutch $C_9$; 86. brake $B_1$.

DETAILED DESCRIPTION OF THE EMBODIMENTS

The present invention is further described below with reference to the accompanying drawings and specific embodiments, but the protection scope of the present invention is not limited thereto.

Figure 1:
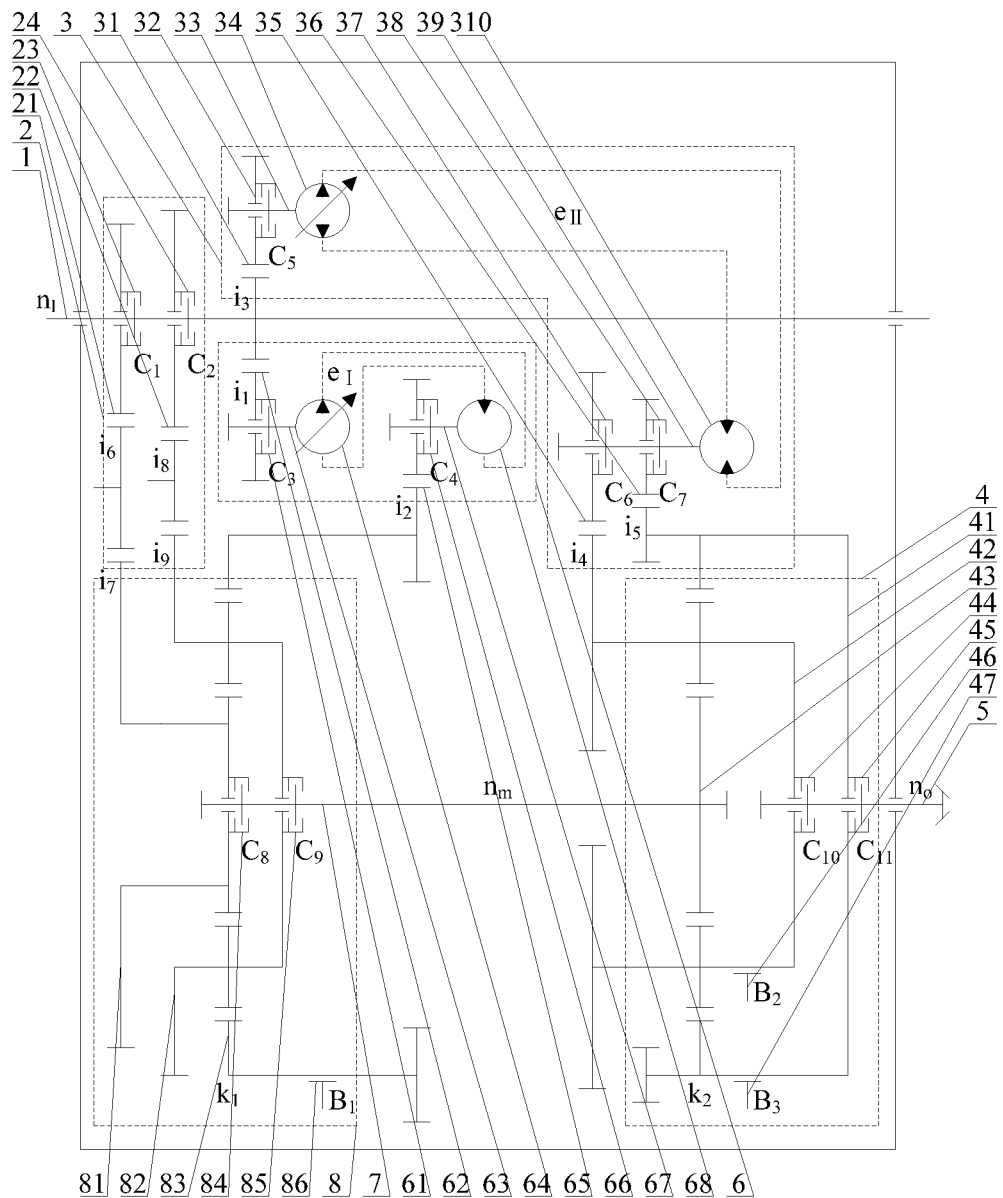
FIG. 1 is a schematic structural diagram of a hydro-mechanical hybrid transmission device with two hydraulic transmission mechanisms according to the present invention.

As shown in FIG. 1, the hydro-mechanical hybrid transmission device with two hydraulic transmission mechanisms of the present invention includes an input shaft 1, a mechanical transmission mechanism 2, a second hydraulic transmission mechanism 3, a rear planetary gear mechanism 4, an output shaft 5, a first hydraulic transmission mechanism 6, a jackshaft 7, and a front planetary gear mechanism 8.

The mechanical transmission mechanism 2 includes a mechanical transmission mechanism-front gear pair 21 and a mechanical transmission mechanism-rear gear pair 22.

The second hydraulic transmission mechanism 3 includes a second hydraulic transmission mechanism-input gear pair 31, a second pump shaft 33, a two-way pump 34, a second hydraulic transmission mechanism-first output gear pair 35, a second hydraulic transmission mechanism-second output gear pair 36, a second motor shaft 39, and a two-way motor 310. The second pump shaft 33 is connected to the second hydraulic transmission mechanism-input gear pair 31, the two-way pump 34 drives the second motor shaft 39 of the two-way motor 310 to rotate, and the second motor shaft 39 is connected to the second hydraulic transmission mechanism-second output gear pair 36 and the second hydraulic transmission mechanism-first output gear pair 35.

The first hydraulic transmission mechanism 6 includes a first hydraulic transmission mechanism-input gear pair 62, a first pump shaft 63, a one-way pump 64, a first hydraulic transmission mechanism-output gear pair 65, a first motor shaft 67, and a one-way motor 68. The first pump shaft 63 is connected to the first hydraulic transmission mechanism-input gear pair 62, the one-way pump 64 drives the first motor shaft 67 of the one-way motor 68 to rotate, and the first motor shaft 67 is connected to the first hydraulic transmission mechanism-output gear pair 65.

The front planetary gear mechanism 8 includes a front planetary gear mechanism-sun gear 81, a front planetary gear mechanism-planet carrier 82, and a front planetary gear mechanism-ring gear 83. The front planetary gear mechanism-sun gear 81 is connected to the input shaft 1 through the mechanical transmission mechanism-front gear pair 21, the front planetary gear mechanism-planet carrier 82 is connected to the input shaft 1 through the mechanical transmission mechanism-rear gear pair 22, the front planetary gear mechanism-ring gear 83 is connected to an output end of the first hydraulic transmission mechanism 6 through the first hydraulic transmission mechanism-output gear pair 65, and an input end of the first hydraulic transmission mechanism 6 is connected to the input shaft 1.

The rear planetary gear mechanism 4 includes a rear planetary gear mechanism-ring gear 41, a rear planetary gear mechanism-planet carrier 42, and a rear planetary gear mechanism-sun gear 43. The rear planetary gear mechanism-sun gear 43 is connected to the jackshaft 7, the rear planetary gear mechanism-planet carrier 42 is connected to an output end of the second hydraulic transmission mechanism 3 through the second hydraulic transmission mechanism-first output gear pair 35, the rear planetary gear mechanism-ring gear 41 is also connected to the output end of the second hydraulic transmission mechanism 3 through the second hydraulic transmission mechanism-second output gear pair 36, and an input end of the second hydraulic transmission mechanism 3 is connected to the input shaft 1.

The clutch assembly includes a clutch $C_1$ 23, a clutch $C_2$ 24, a clutch $C_3$ 61, a clutch $C_4$ 66, a clutch $C_5$ 32, a clutch $C_6$ 37, a clutch $C_7$ 38, a clutch $C_8$ 84, a clutch $C_9$ 85, a clutch $C_{10}$ 44, and a clutch $C_{11}$ 45. The clutch $C_1$ 23 is used for selectively connecting the input shaft 1 to the front planetary gear mechanism-sun gear 81 through the mechanical transmission mechanism-front gear pair 21 to achieve synchronous rotation, the clutch $C_2$ 24 is used for selectively connecting the input shaft 1 to the front planetary gear mechanism-planet carrier 82 through the mechanical transmission mechanism-rear gear pair 22 to achieve synchronous rotation, the clutch $C_3$ 61 is used for selectively connecting the input shaft 1 to the first pump shaft 63 through the first hydraulic transmission mechanism-input gear pair 62 to achieve synchronous rotation, the clutch $C_4$ 66 is used for selectively connecting the first motor shaft 67 to the front planetary gear mechanism-ring gear 83 through the first hydraulic transmission mechanism-output gear pair 65 to achieve synchronous rotation, the clutch $C_5$ 32 is used for selectively connecting the input shaft 1 to the second pump shaft 33 through the second hydraulic transmission mechanism-input gear pair 31 to achieve synchronous rotation, the clutch $C_6$ 37 is used for selectively connecting the second motor shaft 39 to the rear planetary gear mechanism-planet carrier 42 through the second hydraulic transmission mechanism-first output gear pair 35 to achieve synchronous rotation, the clutch $C_7$ 38 is used for selectively connecting the second motor shaft 39 to the rear planetary gear mechanism-ring gear 41 through the second hydraulic transmission mechanism-second output gear pair 36 to achieve synchronous rotation, the clutch $C_8$ 84 is used for selectively connecting the front planetary gear mechanism-sun gear 81 to the jackshaft 7 to achieve synchronous rotation, the clutch $C_9$ 85 is used for selectively connecting the front planetary gear mechanism-planet carrier 82 to the jackshaft 7 to achieve synchronous rotation, the clutch $C_{10}$ 44 is used for selectively connecting the rear planetary gear mechanism-planet carrier 42 to the output shaft 5 to achieve synchronous rotation, and the clutch $C_{11}$ 45 is used for selectively connecting the rear planetary gear mechanism-ring gear 41 to the output shaft 5 to achieve synchronous rotation.

The brake assembly includes a brake $B_1$ 86, a brake $B_2$ 46, and a brake $B_3$ 47. The brake $B_1$ 86 is used for selectively fixing the front planetary gear mechanism-ring gear 83; the brake $B_2$ 46 is used for selectively fixing the rear planetary gear mechanism-planet carrier 42; and the brake $B_3$ 47 is used for selectively fixing the rear planetary gear mechanism-ring gear 41.

Transmission modes including hydraulic transmission, mechanical transmission, single hydro-mechanical transmission, and dual hydro-mechanical transmission are provided between the input member 1 and the output member 5 by adjusting a displacement ratio of the second hydraulic transmission mechanism 3 and/or the first hydraulic transmission mechanism 6 and selectively controlling engagement of the clutch assembly and the brake assembly. Table 1 shows the engagement state of mode-switching components in each gear.

TABLE 1

Engagement state of mode-switching components

| Gear | Direction | Symbol | $C_1$ | $C_2$ | $C_3$ | $C_4$ | $C_5$ | $C_6$ | $C_7$ | $C_8$ | $C_9$ | $C_{10}$ | $C_{11}$ | $B_1$ | $B_2$ | $B_3$ |
|---|---|---|---|---|---|---|---|---|---|---|---|---|---|---|---|---|
| First hydraulic gear | Forward | $F_I(H)$ | △ | △ | ▲ | ▲ | △ | △ | △ | ▲ | ▲ | △ | △ | △ | △ | ▲ |
|  | Reverse | $R_I(H)$ | △ | △ | ▲ | ▲ | △ | △ | △ | ▲ | ▲ | △ | △ | ▲ | ▲ | △ |
| Mechanical gear-1 | Forward | $F_{I-1}(M)$ | ▲ | △ | △ | △ | △ | △ | △ | △ | ▲ | △ | ▲ | △ | △ | ▲ |
|  | Reverse | $R_{I-1}(M)$ | ▲ | △ | △ | △ | △ | △ | △ | △ | ▲ | △ | ▲ | ▲ | ▲ | △ |
| Mechanical gear-2 | Forward | $F_{I-2}(M)$ | △ | ▲ | △ | △ | △ | △ | △ | △ | ▲ | △ | ▲ | △ | △ | ▲ |
|  | Reverse | $R_{I-2}(M)$ | △ | ▲ | △ | △ | △ | △ | △ | △ | ▲ | △ | ▲ | ▲ | ▲ | △ |
| Mechanical gear-3 | Forward | $F_{I-3}(M)$ | ▲ | △ | △ | △ | △ | △ | △ | ▲ | △ | △ | ▲ | △ | △ | ▲ |
|  | Reverse | $R_{I-3}(M)$ | ▲ | △ | △ | △ | △ | △ | △ | ▲ | △ | △ | ▲ | ▲ | ▲ | △ |
| Mechanical gear-4 | Forward | $F_{I-4}(M)$ | △ | ▲ | △ | △ | △ | △ | △ | ▲ | △ | △ | ▲ | △ | △ | ▲ |
|  | Reverse | $R_{I-4}(M)$ | △ | ▲ | △ | △ | △ | △ | △ | ▲ | △ | △ | ▲ | ▲ | ▲ | △ |
| First single hydro-mechanical gear-1 | Forward | $F_{I-1}(HM)$ | ▲ | △ | ▲ | ▲ | △ | △ | △ | △ | ▲ | △ | ▲ | △ | △ | ▲ |
|  | Reverse | $R_{I-1}(HM)$ | ▲ | △ | ▲ | ▲ | △ | △ | △ | △ | ▲ | △ | ▲ | ▲ | ▲ | △ |
| First single hydro-mechanical gear-2 | Forward | $F_{I-2}(HM)$ | △ | ▲ | ▲ | ▲ | △ | △ | △ | △ | ▲ | △ | ▲ | △ | △ | ▲ |
|  | Reverse | $R_{I-2}(HM)$ | △ | ▲ | ▲ | ▲ | △ | △ | △ | △ | ▲ | △ | ▲ | ▲ | ▲ | △ |
| Second hydraulic gear | Forward | $F_{II}(H)$ | △ | △ | △ | △ | ▲ | △ | ▲ | △ | △ | ▲ | △ | △ | △ | △ |
|  | Reverse | $R_{II}(H)$ | △ | △ | △ | △ | ▲ | ▲ | △ | △ | △ | ▲ | △ | △ | △ | △ |
| Second single hydro-mechanical | Forward | $F_{II-1}(HM)$ | ▲ | △ | △ | △ | ▲ | △ | ▲ | ▲ | △ | ▲ | △ | △ | △ | △ |
|  |  | $F_{II-2}(HM)$ | ▲ | △ | △ | △ | ▲ | ▲ | △ | ▲ | △ | ▲ | △ | △ | △ | △ |

TABLE 1-continued

Engagement state of mode-switching components

| | | | Gear-shift execution mechanism | | | | | | | | | | | | | |
|---|---|---|---|---|---|---|---|---|---|---|---|---|---|---|---|---|
| Gear | Direction | Symbol | $C_1$ | $C_2$ | $C_3$ | $C_4$ | $C_5$ | $C_6$ | $C_7$ | $C_8$ | $C_9$ | $C_{10}$ | $C_{11}$ | $B_1$ | $B_2$ | $B_3$ |
| Dual hydro-mechanical gear-1 | Forward | $F_{I-II-1}$(HM) | ▲ | Δ | ▲ | ▲ | ▲ | Δ | ▲ | Δ | ▲ | ▲ | Δ | Δ | Δ | Δ |
| | Reverse | $R_{I-II-1}$(HM) | ▲ | Δ | ▲ | ▲ | ▲ | ▲ | Δ | Δ | ▲ | Δ | ▲ | Δ | Δ | Δ |
| Dual hydro-mechanical gear-2 | Forward | $F_{I-II-2}$(HM) | Δ | ▲ | ▲ | ▲ | ▲ | Δ | ▲ | Δ | ▲ | Δ | Δ | Δ | Δ | Δ |
| | Reverse | $R_{I-II-2}$(HM) | Δ | ▲ | ▲ | ▲ | ▲ | ▲ | Δ | ▲ | Δ | Δ | ▲ | Δ | Δ | Δ |

In Table 1: C stands for clutch and B stands for brake; F stands for forward gear and R stands for reverse gear; H stands for hydraulic transmission, M stands for mechanical transmission, and HM stands for hydro-mechanical transmission; I stands for first hydraulic transmission mechanism, II stands for second hydraulic transmission mechanism, and I-II stands for both hydraulic transmission mechanisms.

Figure 2:
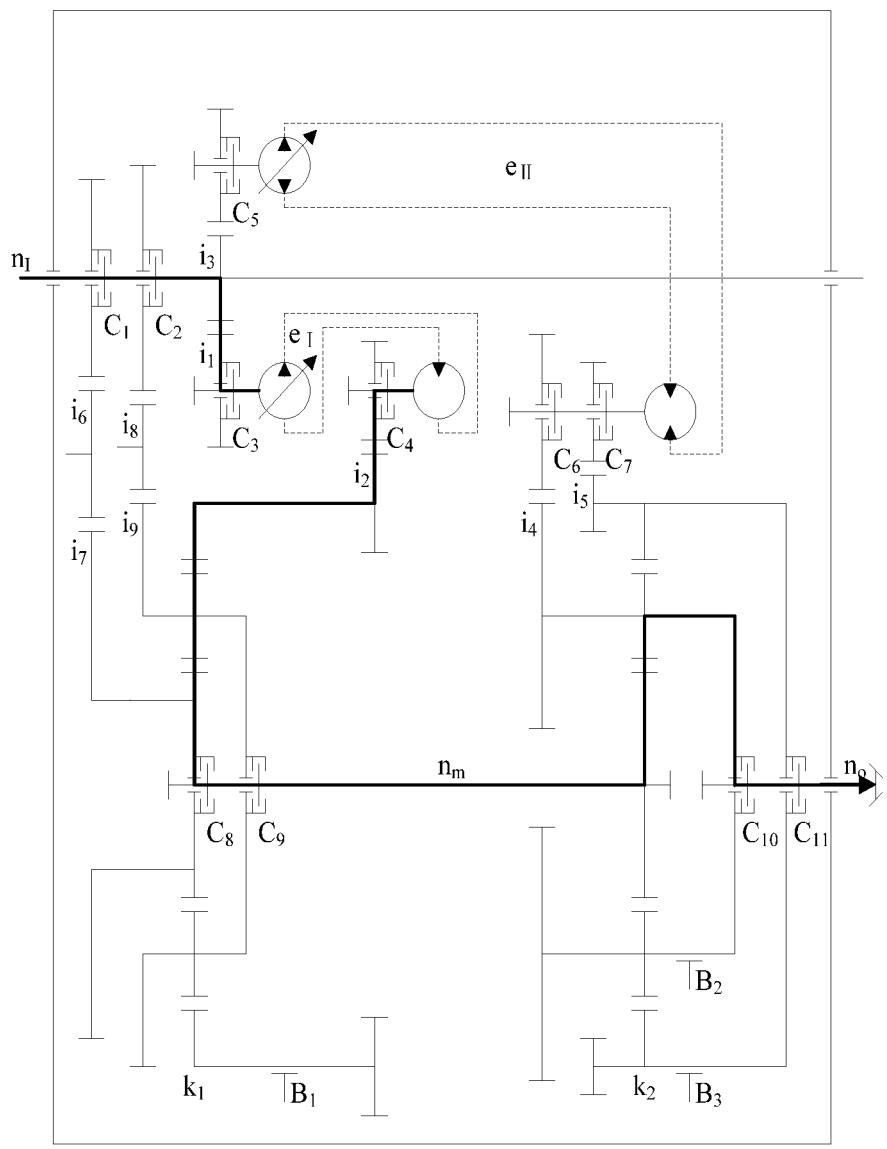
FIG. 2 is a schematic diagram showing the forward power flow in hydraulic transmission in which a first hydraulic transmission mechanism participates according to the present invention.

1. The first hydraulic transmission in which the first hydraulic transmission mechanism participates:

The first hydraulic forward gear, that is, $F_f$(H) gear, is shown in FIG. 2, wherein the clutch $C_3$ 61, the clutch $C_4$ 66, the clutch $C_8$ 84, the clutch $C_9$ 85, the clutch $C_{10}$ 44, and the brake $B_3$ 47 are engaged. The engine power transmitted by the input shaft 1 passes through the first hydraulic transmission mechanism-input gear pair 62 to drive the first pump shaft 63, the one-way pump 64 drives the one-way motor 68, and the power output from the first motor shaft 67 passes through the first hydraulic transmission mechanism-output gear pair 65 to drive the front planetary gear mechanism-ring gear 83. Then, the power passes through the front planetary gear mechanism 8 that is fixedly connected as a whole and the jackshaft 7 and is transmitted to the rear planetary gear mechanism-sun gear 43. After that, the power passes through the rear planetary gear mechanism-planet carrier 42 and is output from the output shaft 5. In this case, the output shaft 5 and the input shaft 1 rotate in the same direction, which is expressed by the following formula:

$$n_o = \frac{e_I}{i_1 i_2 (k_2 + 1)} n_I$$

wherein $n_I$ is the rotation speed of the input shaft 1, $n_o$ is the rotation speed of the output shaft, $e_I$ is the displacement ratio of the first hydraulic transmission mechanism and $e_I \in [0, 1]$, $i_1$ is a transmission ratio of the first hydraulic transmission mechanism-input gear pair 62, $i_2$ is a transmission ratio of the first hydraulic transmission mechanism-output gear pair 65, and $k_2$ is a characteristic parameter of the rear planetary gear mechanism.

The first hydraulic reverse gear, that is, $R_f$(H) gear, is shown in FIG. 2, wherein the clutch $C_{10}$ 44 and the brake $B_3$ 47 are disengaged while the clutch $C_{11}$ 45 and the brake $B_2$ 46 are engaged. The power passes through the front planetary gear mechanism 8 that is fixedly connected as a whole and the jackshaft 7 and is transmitted to the rear planetary gear mechanism-sun gear 43. After that, the power passes through the rear planetary gear mechanism-ring gear 41 and is output from the output shaft 5. In this case, the output shaft 5 and the input shaft 1 rotate in opposite directions, which is expressed by the following formula:

$$n_o = -\frac{e_I}{i_1 i_2 k_2} n_I.$$

Figure 3:
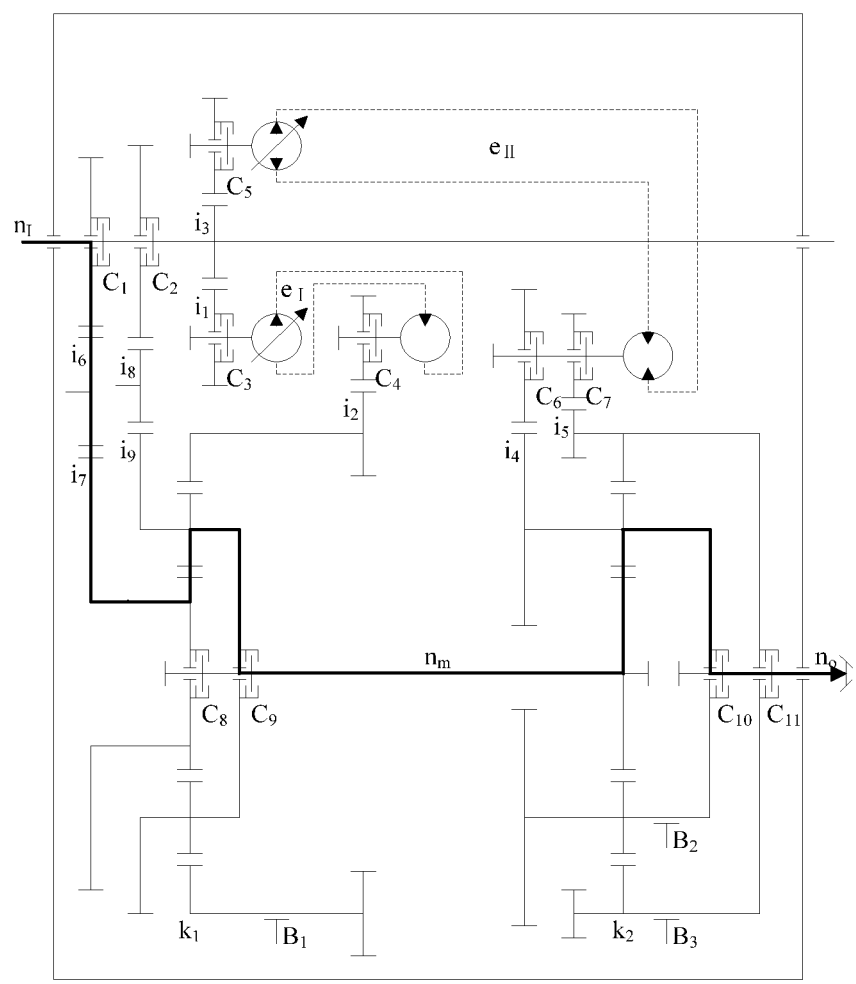
FIG. 3 is a schematic diagram showing the forward power flow in a mechanical transmission gear-1 according to the present invention.

2. The mechanical transmission:

The mechanical transmission forward gear-1, that is, $F_{I-1}$(M), is shown in FIG. 3, wherein the clutch $C_1$ 23, the clutch $C_9$ 85, the clutch $C_{10}$ 44, the brake $B_1$ 86, and the brake $B_3$ 47 are engaged. The engine power transmitted by the input shaft 1 passes through the mechanical transmission mechanism-front gear pair 21 and the front planetary gear mechanism-sun gear 81 to drive the front planetary gear mechanism-planet carrier 82. Then, the power that is transmitted through the jackshaft 7 to the rear planetary gear mechanism-sun gear 43 passes through the rear planetary gear mechanism-planet carrier 42 and is output from the output shaft 5. In this case, the output shaft 5 and the input shaft 1 rotate in the same direction, which is expressed by the following formula:

$$n_o = \frac{1}{i_6 i_7 (k_1 + 1)(k_2 + 1)} n_I$$

wherein $i_6 i_7$ is a transmission ratio between the input shaft 1 and the front planetary gear mechanism-sun gear 81 and $k_1$ is a characteristic parameter of the front planetary gear mechanism.

The mechanical transmission reverse gear-1, that is, $R_{I-1}$(M), is shown in FIG. 3, wherein the clutch $C_{10}$ 44 and the brake $B_3$ 47 are disengaged while the clutch $C_{11}$ 45 and the brake $B_2$ 46 are engaged. The power that is transmitted through the jackshaft 7 to the rear planetary gear mechanism-sun gear 43 passes through the rear planetary gear mechanism-ring gear 41 and is output from the output shaft 5. In this case, the output shaft 5 and the input shaft 1 rotate in opposite directions, which is expressed by the following formula:

$$n_o = -\frac{1}{i_6 i_7 (k_1 + 1) k_2} n_I.$$

Figure 4:
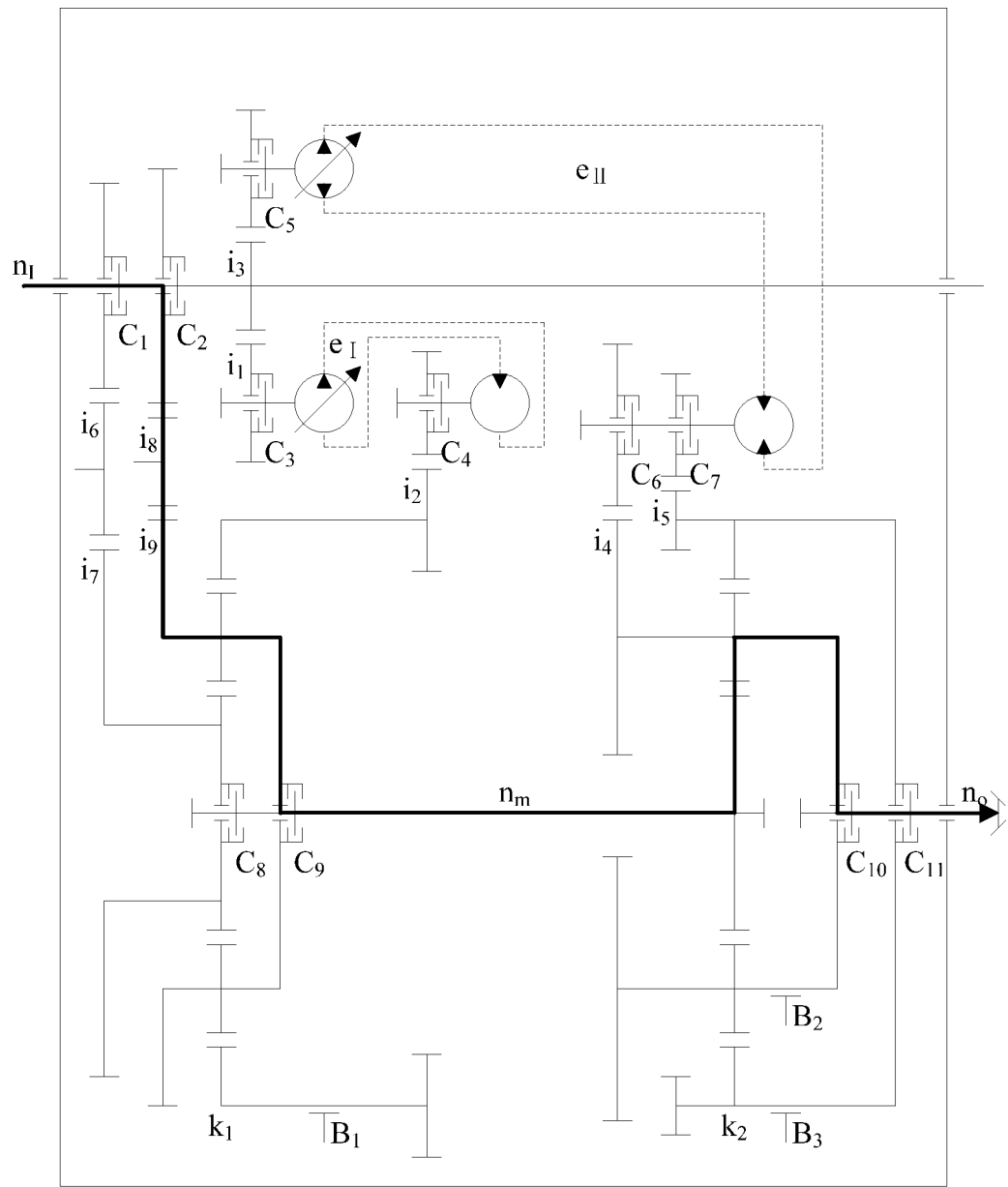
FIG. 4 is a schematic diagram showing the forward power flow in a mechanical transmission gear-2 according to the present invention.

The mechanical transmission forward gear-2, that is, $F_{I-2}$(M), is shown in FIG. 4, wherein the clutch $C_2$ 24, the clutch $C_9$ 85, the clutch $C_{10}$ 44, and the brake $B_3$ 47 are engaged. The engine power transmitted by the input shaft 1 passes through the mechanical transmission mechanism-rear gear pair 22 to drive the front planetary gear mechanism-planet carrier 82. Then, the power that is transmitted through the jackshaft 7 to the rear planetary gear mechanism-sun gear 43 passes through the rear planetary gear mechanism-planet carrier 42 and is output from the output shaft 5. In this case, the output shaft 5 and the input shaft 1 rotate in the same direction, which is expressed by the following formula:

$$n_o = \frac{1}{i_8 i_9 (k_2 + 1)} n_I$$

wherein $i_8 i_9$ is a transmission ratio between the input shaft 1 and the front planetary gear mechanism-planet carrier 82.

The mechanical transmission reverse gear-2, that is, $R_{I-2}$ (M), is shown in FIG. 4, wherein the clutch $C_{10}$ 44 and the brake $B_3$ 47 are disengaged while the clutch $C_{11}$ 45 and the brake $B_2$ 46 are engaged. The power that is transmitted through the jackshaft 7 to the rear planetary gear mechanism-sun gear 43 passes through the rear planetary gear mechanism-ring gear 41 and is output from the output shaft 5. In this case, the output shaft 5 and the input shaft 1 rotate in opposite directions, which is expressed by the following formula:

$$n_o = -\frac{1}{i_8 i_9 k_2} n_I.$$

Figure 5:
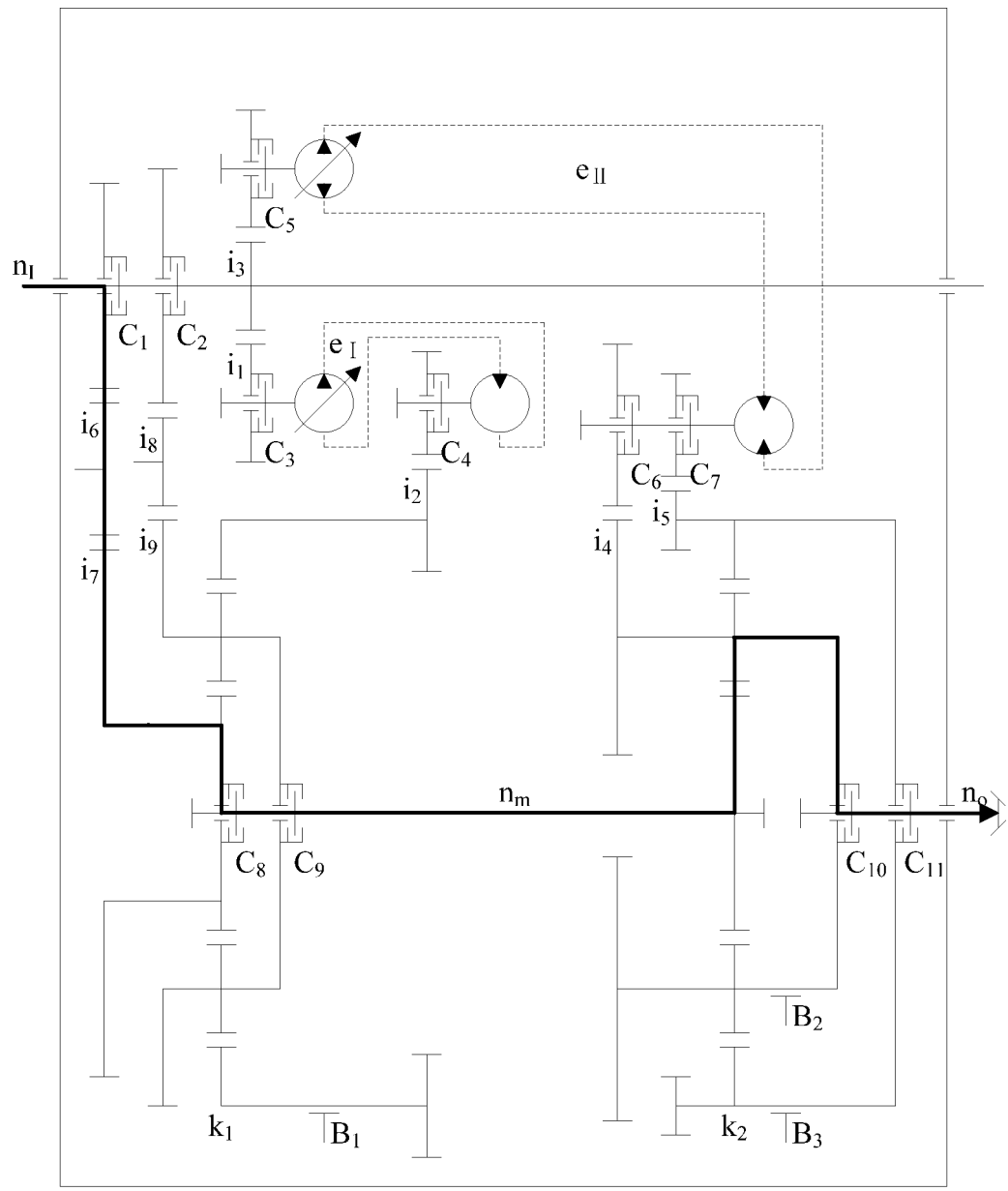
FIG. 5 is a schematic diagram showing the forward power flow in a mechanical transmission gear-3 according to the present invention.

The mechanical transmission forward gear-3, that is, $F_{I-3}$(M), is shown in FIG. 5, wherein the clutch $C_1$ 23, the clutch $C_8$ 84, the clutch $C_{10}$ 44, and the brake $B_3$ 47 are engaged. The engine power transmitted by the input shaft 1 passes through the mechanical transmission mechanism-front gear pair 21 to drive the front planetary gear mechanism-sun gear 81. Then, the power that is transmitted through the jackshaft 7 to the rear planetary gear mechanism-sun gear 43 passes through the rear planetary gear mechanism-planet carrier 42 and is output from the output shaft 5. In this case, the output shaft 5 and the input shaft 1 rotate in the same direction, which is expressed by the following formula:

$$n_o = \frac{1}{i_6 i_7 (k_2 + 1)} n_I.$$

The mechanical transmission reverse gear-3, that is, $R_{I-3}$ (M), is shown in FIG. 5, wherein the clutch $C_{10}$ 44 and the brake $B_3$ 47 are disengaged while the clutch $C_{11}$ 45 and the brake $B_2$ 46 are engaged. The power that is transmitted through the jackshaft 7 to the rear planetary gear mechanism-sun gear 43 passes through the rear planetary gear mechanism-ring gear 41 and is output from the output shaft 5. In this case, the output shaft 5 and the input shaft 1 rotate in opposite directions, which is expressed by the following formula:

$$n_o = -\frac{1}{i_6 i_7 k_2} n_I.$$

Figure 6:
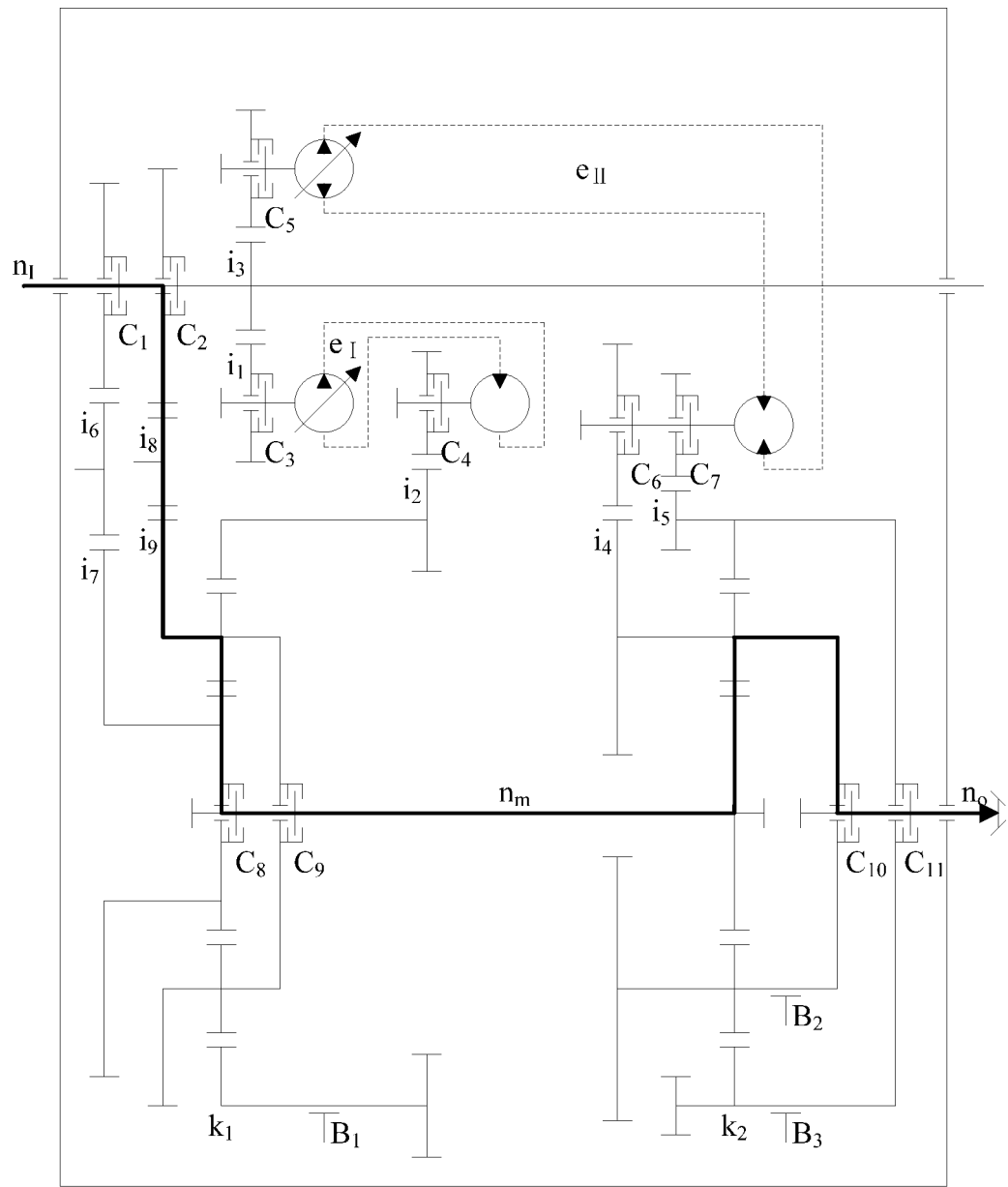
FIG. 6 is a schematic diagram showing the forward power flow in a mechanical transmission gear-4 according to the present invention.

The mechanical transmission forward gear-4, that is, $F_{I-4}$(M), is shown in FIG. 6, wherein the clutch $C_2$ 24, the clutch $C_8$ 84, the clutch $C_{10}$ 44, the brake $B_1$ 86, and the brake $B_3$ 47 are engaged. The engine power transmitted by the input shaft 1 passes through the mechanical transmission mechanism-rear gear pair 22 and the front planetary gear mechanism-planet carrier 82 to drive the front planetary gear mechanism-sun gear 81. Then, the power that is transmitted through the jackshaft 7 to the rear planetary gear mechanism-sun gear 43 passes through the rear planetary gear mechanism-planet carrier 42 and is output from the output shaft 5. In this case, the output shaft 5 and the input shaft 1 rotate in the same direction, which is expressed by the following formula:

$$n_o = \frac{k_1 + 1}{i_8 i_9 (k_2 + 1)} n_I.$$

The mechanical transmission reverse gear-4, that is, $R_{I-4}$ (M), is shown in FIG. 6, wherein the clutch $C_{10}$ 44 and the brake $B_3$ 47 are disengaged while the clutch $C_{11}$ 45 and the brake $B_2$ 46 are engaged. The power that is transmitted through the jackshaft 7 to the rear planetary gear mechanism-sun gear 43 passes through the rear planetary gear mechanism-ring gear 41 and is output from the output shaft 5. In this case, the output shaft 5 and the input shaft 1 rotate in opposite directions, which is expressed by the following formula:

$$n_o = -\frac{k_1 + 1}{i_8 i_9 k_2} n_I.$$

Figure 7:
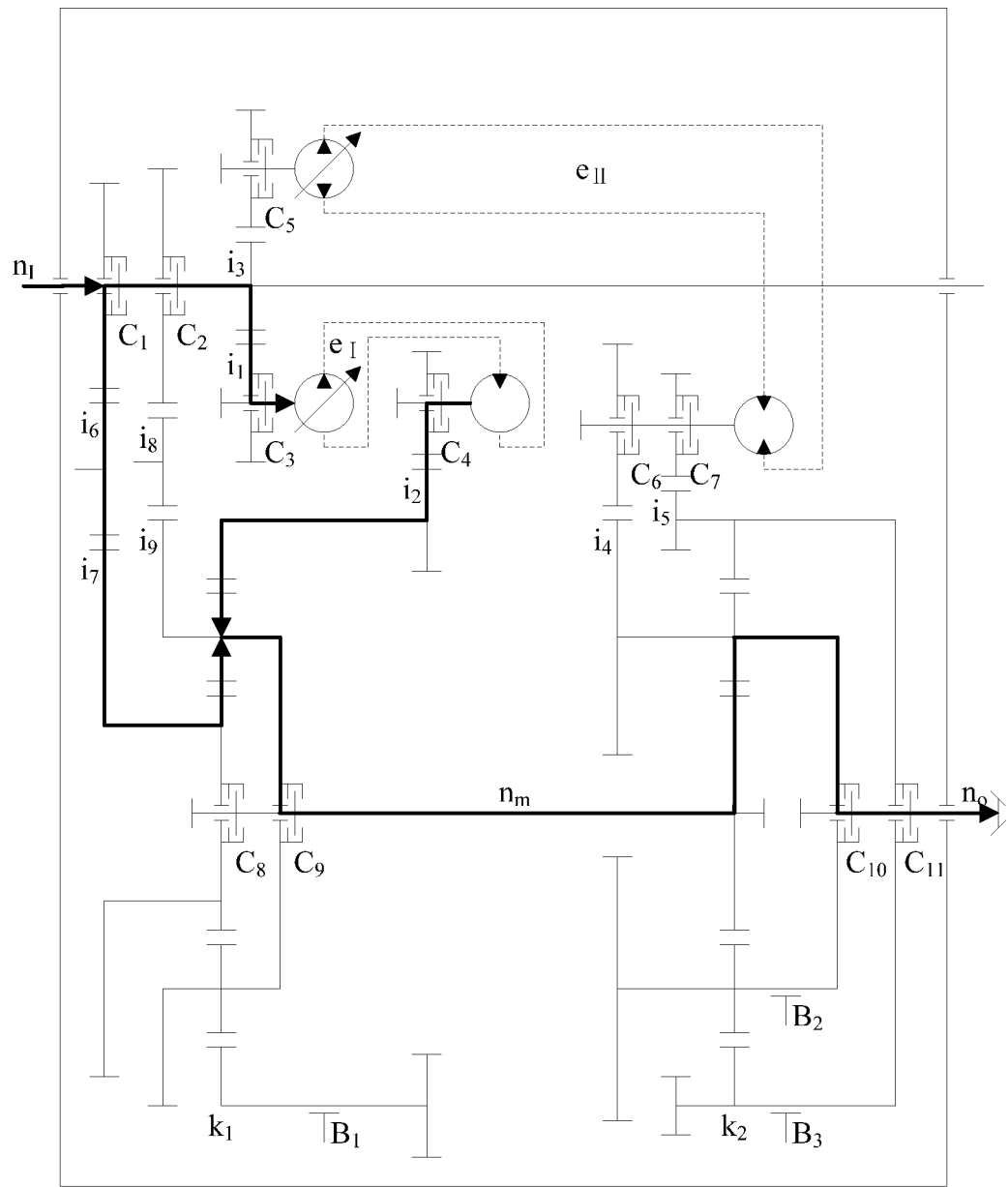
FIG. 7 is a schematic diagram showing the forward power flow in a hydro-mechanical transmission gear-1 in which the first hydraulic transmission mechanism participates according to the present invention.

3. The first single hydro-mechanical transmission in which the first hydraulic transmission mechanism participates:

The first single hydro-mechanical transmission forward gear-1, that is, $F_{I-1}$(HM), is shown in FIG. 7, wherein the clutch $C_1$ 23, the clutch $C_3$ 61, the clutch $C_4$ 66, the clutch $C_9$ 85, the clutch $C_{10}$ 44, and the brake $B_3$ 47 are engaged. The engine power is split at the input shaft 1, one part of the power is transmitted through the first hydraulic transmission mechanism 6 to the front planetary gear mechanism-ring gear 83, and the other part of the power is transmitted through the mechanical transmission mechanism-front gear pair 21 to the front planetary gear mechanism-sun gear 81. The power that is converged at the front planetary gear mechanism-planet carrier 82 is transmitted through the jackshaft 7 to the rear planetary gear mechanism-sun gear 43, then passes through the rear planetary gear mechanism-planet carrier 42, and is output from the output shaft 5. In this case, the output shaft 5 and the input shaft 1 rotate in the same direction, which is expressed by the following formula:

$$n_o = \frac{\frac{1}{i_6 i_7} + \frac{k_1 e_I}{i_1 i_2}}{(k_1 + 1)(k_2 + 1)} n_I.$$

The first single hydro-mechanical transmission reverse gear-1, that is, $R_{I-1}$(HM), is shown in FIG. 7, wherein the clutch $C_{10}$ 44 and the brake $B_3$ 47 are disengaged while the clutch $C_{11}$ 45 and the brake $B_2$ 46 are engaged. The power that is converged at the front planetary gear mechanism-planet carrier 82 is transmitted through the jackshaft 7 to the rear planetary gear mechanism-sun gear 43, then passes through the rear planetary gear mechanism-ring gear 41, and is output from the output shaft 5. In this case, the output shaft 5 and the input shaft 1 rotate in opposite directions, which is expressed by the following formula:

$$n_o = -\frac{\frac{1}{i_6 i_7} + \frac{k_1 e_I}{i_1 i_2}}{(k_1 + 1)k_2} n_I.$$

Figure 8:
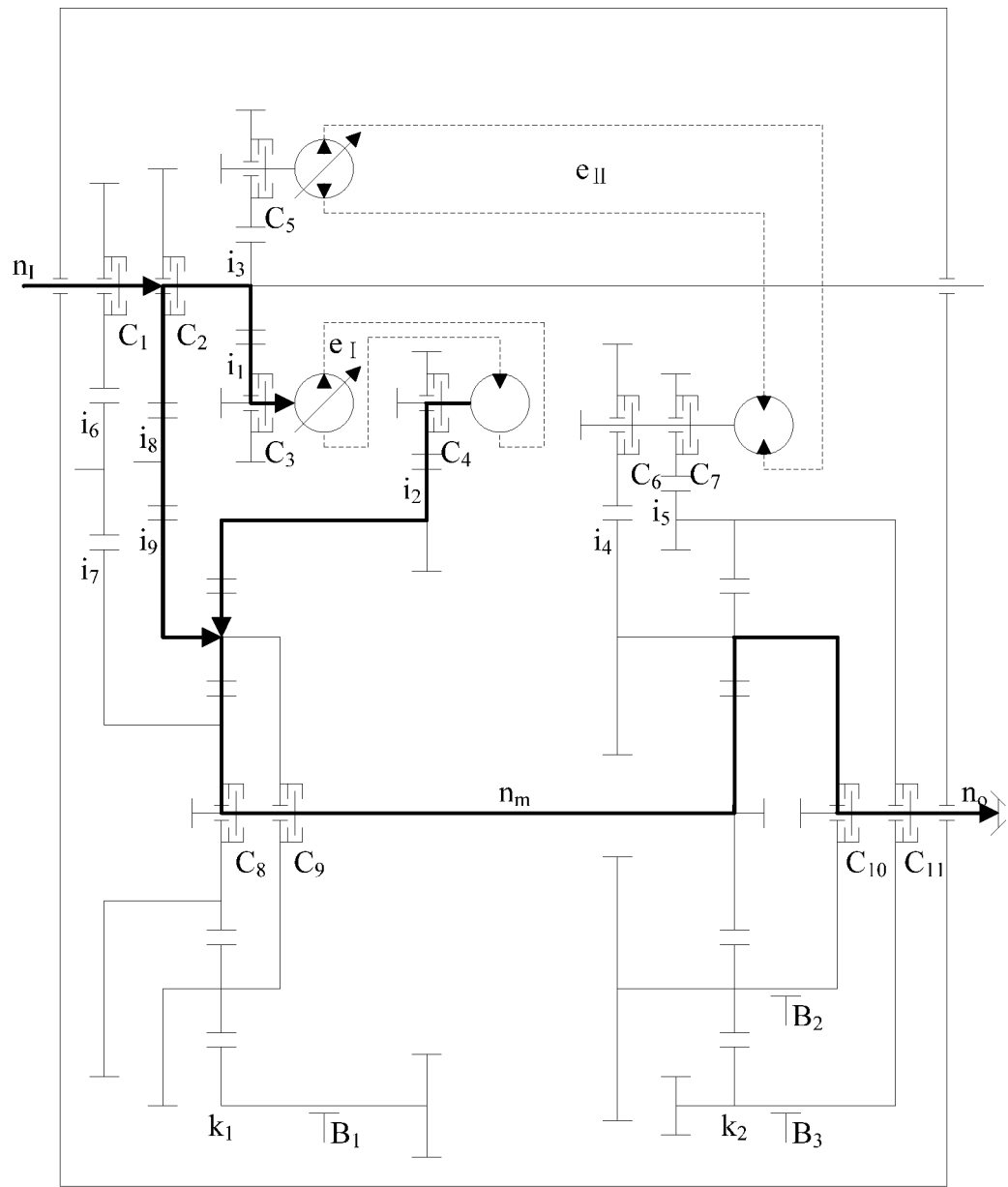
FIG. 8 is a schematic diagram showing the forward power flow in a hydro-mechanical transmission gear-2 in which the first hydraulic transmission mechanism participates according to the present invention.

The first single hydro-mechanical transmission forward gear-2, that is, $F_{I-2}$(HM), is shown in FIG. 8, wherein the clutch $C_2$ 24, the clutch $C_3$ 61, the clutch $C_4$ 66, the clutch $C_8$ 84, the clutch $C_{10}$ 44, and the brake $B_3$ 47 are engaged. The engine power is split at the input shaft 1, one part of the power is transmitted through the first hydraulic transmission mechanism 6 to the front planetary gear mechanism-ring gear 83, and the other part of the power is transmitted through the mechanical transmission mechanism-rear gear pair 22 to the front planetary gear mechanism-planet carrier 82. The power that is converged at the front planetary gear mechanism-sun gear 81 is transmitted through the jackshaft 7 to the rear planetary gear mechanism-sun gear 43, then passes through the rear planetary gear mechanism-planet carrier 42, and is output from the output shaft 5. In this case, the output shaft 5 and the input shaft 1 rotate in the same direction, which is expressed by the following formula:

$$n_o = -\frac{\frac{k_1+1}{i_8 i_9} - \frac{k_1 e_I}{i_1 i_2}}{k_1 + 1} n_I.$$

The first single hydro-mechanical transmission reverse gear-2, that is, $R_{I-2}$(HM), is shown in FIG. 8, wherein the clutch $C_{10}$ 44 and the brake $B_3$ 47 are disengaged while the clutch $C_{11}$ 45 and the brake $B_2$ 46 are engaged. The power that is converged at the front planetary gear mechanism-sun gear 81 is transmitted through the jackshaft 7 to the rear planetary gear mechanism-sun gear 43, then passes through the rear planetary gear mechanism-ring gear 41, and is output from the output shaft 5. In this case, the output shaft 5 and the input shaft 1 rotate in opposite directions, which is expressed by the following formula:

$$n_o = -\frac{\frac{k_1+1}{i_8 i_9} - \frac{k_1 e_I}{i_1 i_2}}{k_2} n_I.$$

Figure 9:
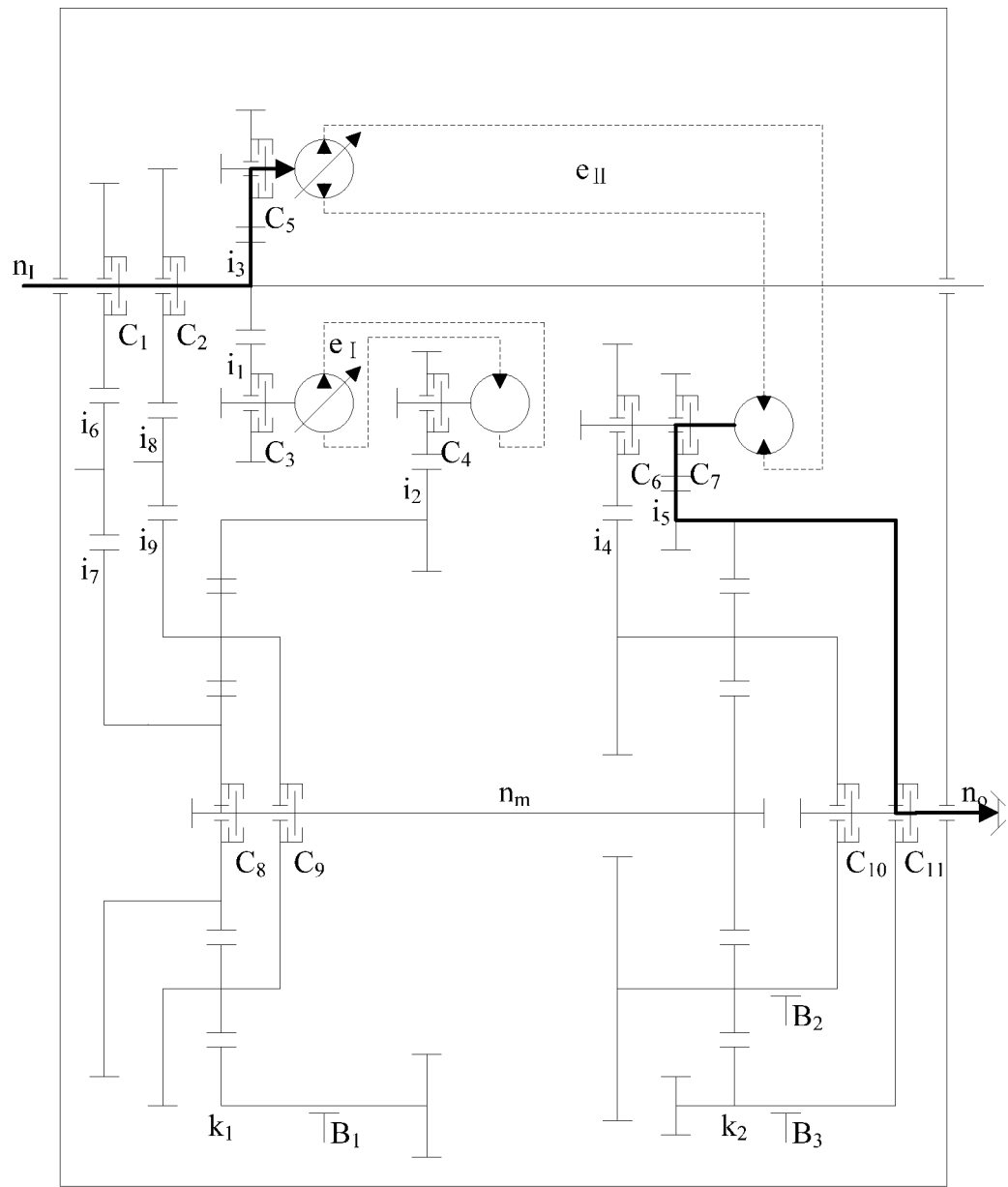
FIG. 9 is a schematic diagram showing the forward power flow in hydraulic transmission in which a second hydraulic transmission mechanism participates according to the present invention.

4. The second hydraulic transmission in which the second hydraulic transmission mechanism participates:

The second hydraulic transmission forward gear, that is, $F_{II}$(H), is shown in FIG. 9, wherein the clutch $C_5$ 32, the clutch $C_7$ 38, and the clutch $C_{11}$ 45 are engaged. The engine power transmitted by the input shaft 1 passes through the second hydraulic transmission mechanism-input gear pair 31 to drive the second pump shaft 33, the two-way pump 34 drives the two-way motor 310, and the power output from the second motor shaft 39 passes through the second hydraulic transmission mechanism-second output gear pair 36 to drive the rear planetary gear mechanism-ring gear 41 and is output from the output shaft 5. In this case, $e_{II} \in [0, 1]$ in the forward hydraulic transmission in which the second hydraulic transmission mechanism participates, and the output shaft 5 and the input shaft 1 rotate in the same direction, which is expressed by the following formula:

$$n_o = \frac{e_{II}}{i_3 i_5} n_I$$

wherein $e_{II}$ is the displacement ratio of the second hydraulic transmission mechanism and $e_{II} \in [-1, 1]$, $i_3$ is the transmission ratio of the second hydraulic transmission mechanism-input gear pair 31, and $i_5$ is the transmission ratio of the second hydraulic transmission mechanism-second output gear pair 36.

Figure 10:
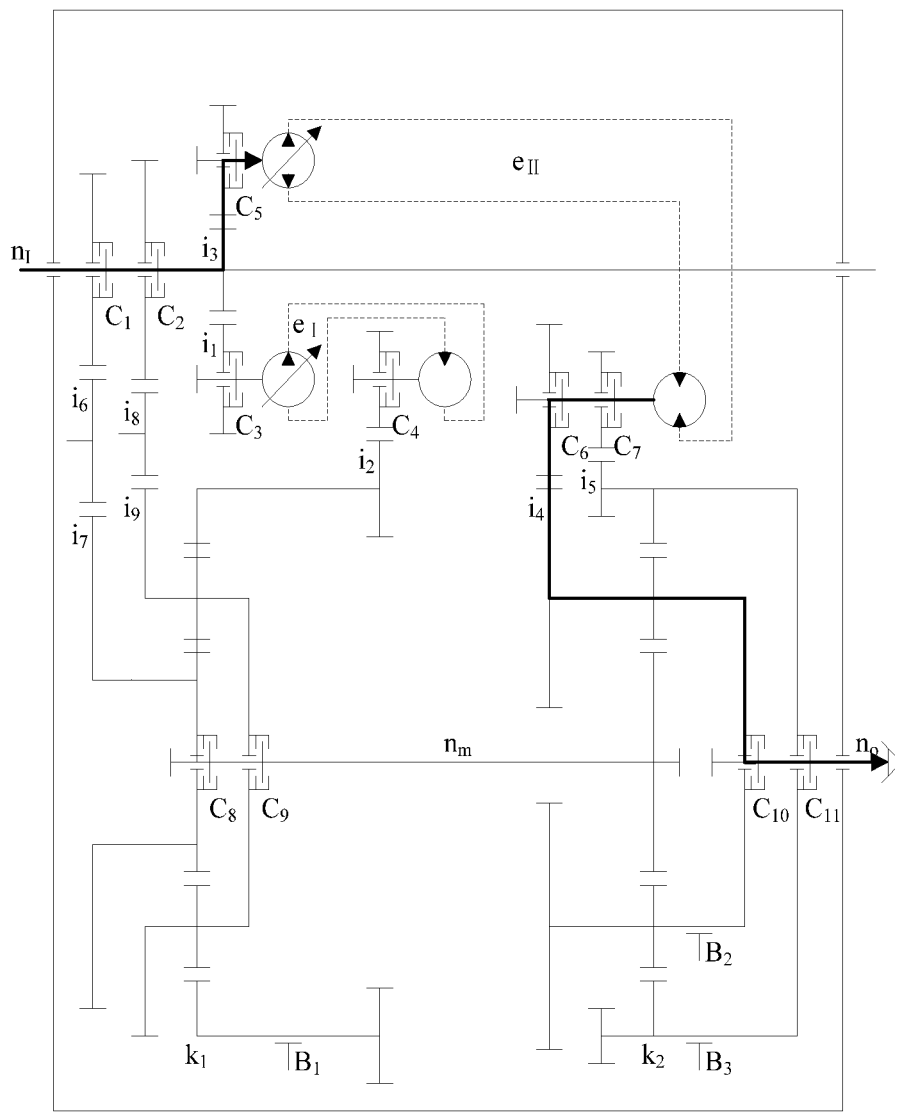
FIG. 10 is a schematic diagram showing the reverse power flow in hydraulic transmission in which the second hydraulic transmission mechanism participates according to the present invention.

The second hydraulic transmission reverse gear, that is, $R_{II}$(H), is shown in FIG. 10, wherein the clutch $C_5$ 32, the clutch $C_6$ 37, and the clutch $C_{10}$ 44 are engaged. The engine power transmitted by the input shaft 1 passes through the second hydraulic transmission mechanism-input gear pair 31 to drive the second pump shaft 33, the two-way pump 34 drives the two-way motor 310, and the power output from the second motor shaft 39 passes through the second hydraulic transmission mechanism-first output gear pair 35 to drive the rear planetary gear mechanism-planet carrier 42 and is output from the output shaft 5. In this case, $e_{II} \in [-1, 0]$ in the reverse hydraulic transmission in which the two-way transmission mechanism participates, and the output shaft 5 and the input shaft 1 rotate in opposite directions, which is expressed by the following formula:

$$n_o = \frac{e_{II}}{i_3 i_4} n_I$$

wherein $i_4$ is the transmission ratio of the second hydraulic transmission mechanism-first output gear pair 35.

Figure 11:
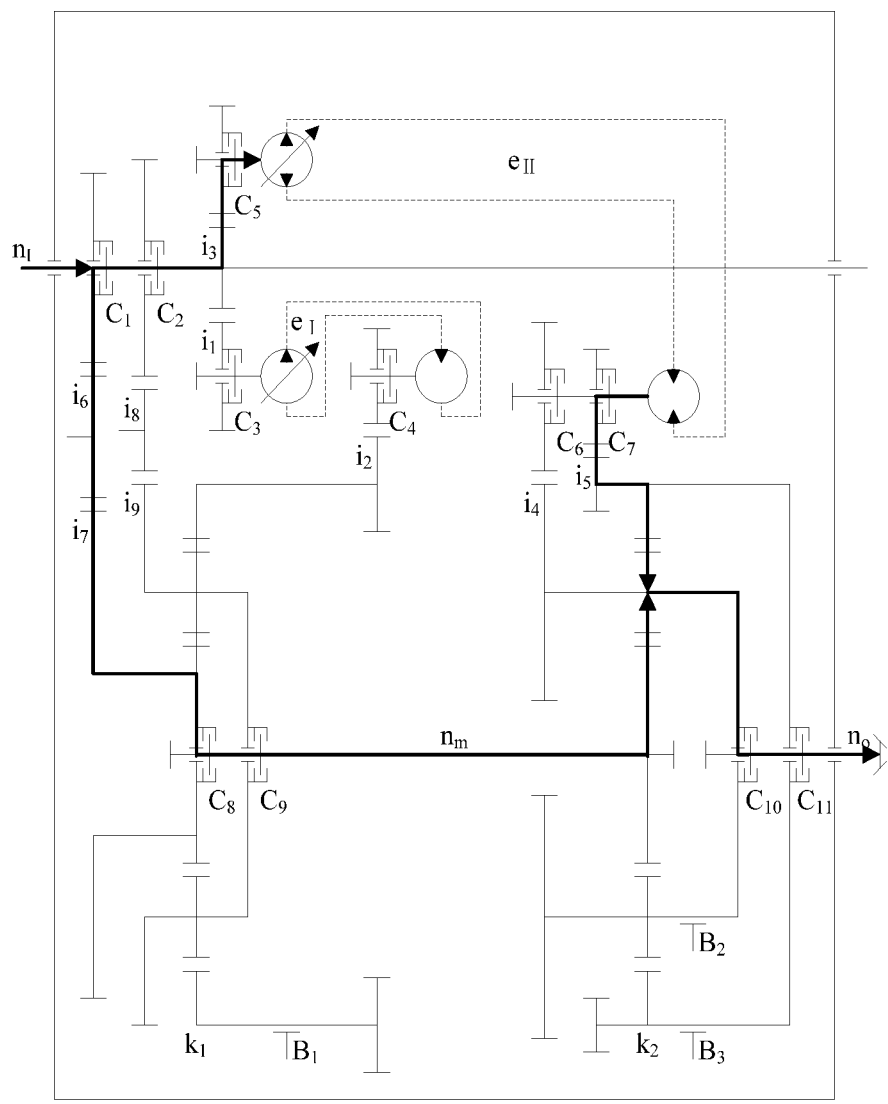
FIG. 11 is a schematic diagram showing the forward power flow in the hydro-mechanical transmission gear-1 in which the second hydraulic transmission mechanism participates according to the present invention.

5. The second single hydro-mechanical transmission in which the second hydraulic transmission mechanism participates:

The second single hydro-mechanical transmission forward gear-1, that is, $F_{II-1}$(HM), is shown in FIG. 11, wherein the clutch $C_1$ 23, the clutch $C_5$ 32, the clutch $C_7$ 38, the clutch $C_8$ 84, and the clutch $C_{10}$ 44 are engaged. The displacement ratio of the second hydraulic transmission mechanism 3 is controlled to make the output speed and the input speed in the same direction. The engine power is split at the input shaft 1, one part of the power is transmitted through the second hydraulic transmission mechanism 3 to the rear planetary gear mechanism-ring gear 41, and the other part of the power is transmitted through the mechanical transmission mechanism-front gear pair 21 to the front planetary gear mechanism-sun gear 81 and is then transmitted through the jackshaft 7 to the rear planetary gear mechanism-sun gear 43. The hydraulic power transmitted to the rear planetary gear mechanism-ring gear 41 and the mechanical power transmitted to the rear planetary gear mechanism-sun gear 43 are converged at the rear planetary gear mechanism-planet carrier 42 and then output from the output shaft 5, which is expressed by the following formula:

$$n_o = \frac{\frac{1}{i_6 i_7} + \frac{k_2 e_{II}}{i_3 i_5}}{k_2 + 1} n_I.$$

Figure 12:
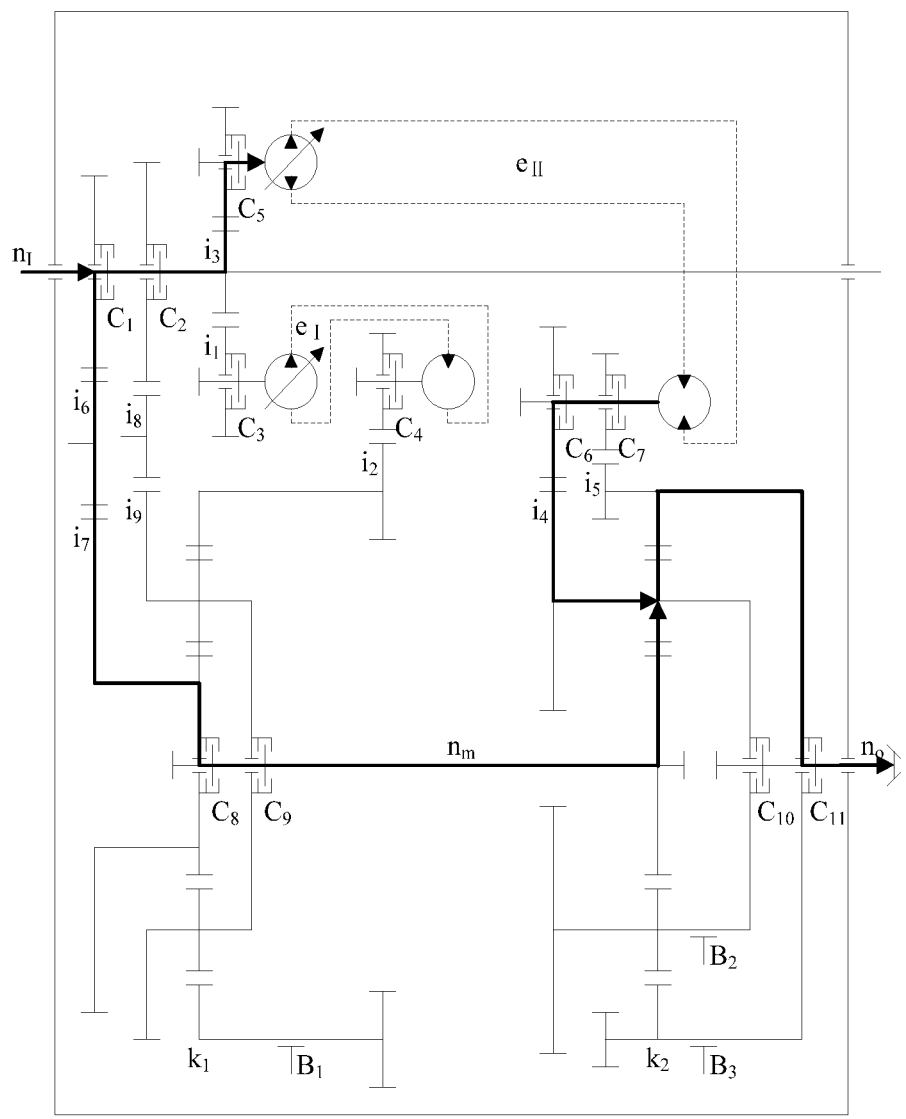
FIG. 12 is a schematic diagram showing the forward power flow in the hydro-mechanical transmission gear-2 in which the second hydraulic transmission mechanism participates according to the present invention.

The second single hydro-mechanical transmission forward gear-2, that is, $F_{II-2}$(HM), is shown in FIG. 12, wherein the clutch $C_1$ 23, the clutch $C_5$ 32, the clutch $C_6$ 37, the clutch $C_8$ 84, and the clutch $C_{11}$ 45 are engaged. The displacement ratio of the second hydraulic transmission mechanism 3 is controlled to make the output speed and the input speed in the same direction. The engine power is split at the input shaft 1, one part of the power is transmitted through the second hydraulic transmission mechanism 3 to the rear planetary gear mechanism-planet carrier 42, and the other part of the power is transmitted through the mechanical transmission mechanism-front gear pair 21 to the front planetary gear mechanism-sun gear 81 and is then transmitted through the jackshaft 7 to the rear planetary gear mechanism-sun gear 43. The hydraulic power transmitted to the rear planetary gear mechanism-planet carrier 42 and the mechanical power transmitted to the rear planetary gear mechanism-sun gear 43 are converged at the rear planetary gear mechanism-ring gear 41 and then output from the output shaft 5, which is expressed by the following formula:

$$n_o = \frac{\frac{(k_2+1)e_{II}}{i_3 i_4} - \frac{1}{i_6 i_7}}{k_2} n_I.$$

Figure 13:
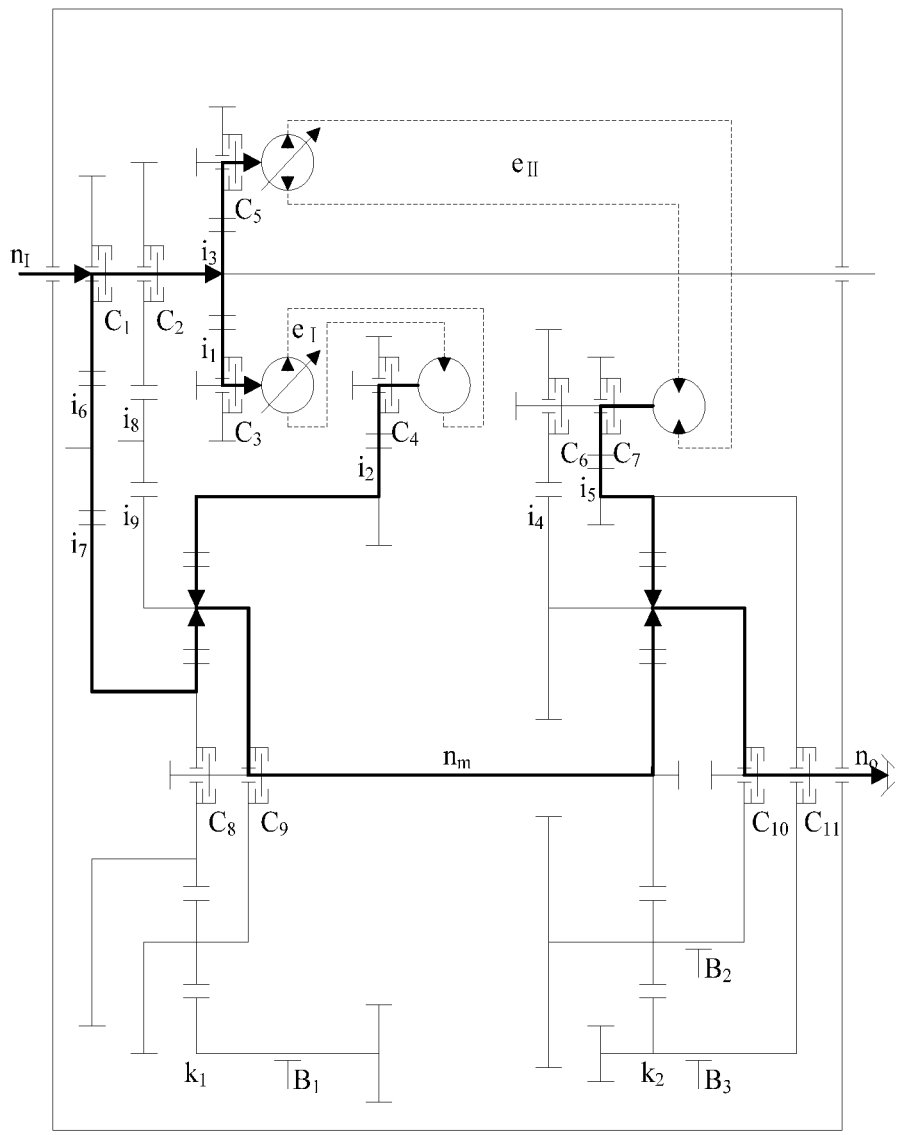
FIG. 13 is a schematic diagram showing the forward power flow in the hydro-mechanical transmission gear-1 in which the two hydraulic transmission mechanisms participate according to the present invention.

6. The dual hydro-mechanical transmission in which the first hydraulic transmission mechanism 6 and the second hydraulic mechanism 3 both participate:

The dual hydro-mechanical transmission forward gear-1, that is, $F_{I\text{-}II\text{-}1}(HM)$, is shown in FIG. 13, wherein the clutch $C_1$ 23, the clutch $C_3$ 61, the clutch $C_4$ 66, the clutch $C_5$ 32, the clutch $C_7$ 38, the clutch $C_9$ 85, and the clutch $C_{10}$ 44 are engaged. The engine power is split at the input shaft 1 into three parts. A first part of the power is transmitted through the mechanical transmission mechanism-front gear pair 21 to the front planetary gear mechanism-sun gear 81. A second part of the power is transmitted through the first hydraulic transmission mechanism 6 to the front planetary gear mechanism-ring gear 83. The hybrid power is transmitted through the front planetary gear mechanism-planet carrier 82 and the jackshaft 7 to the rear planetary gear mechanism-sun gear 43 and is again converged at the rear planetary gear mechanism-planet carrier 42 with a third part of the power that is the hydraulic power transmitted through the second hydraulic transmission mechanism 3 to the rear planetary gear mechanism-ring gear 41. Then, the power is output from the output shaft 5. In this case, $e_{II} \in [0, 1]$ in the forward hydro-mechanical transmission in which the two transmission mechanisms participate, and the output shaft 5 and the input shaft 1 rotate in the same direction, which is expressed by the following formula:

$$n_o = \frac{\frac{\frac{1}{i_6 i_7} + \frac{k_1 e_I}{i_1 i_2}}{k_1 + 1} + \frac{k_2 e_{II}}{i_3 i_5}}{k_2 + 1} n_I.$$

Figure 14:
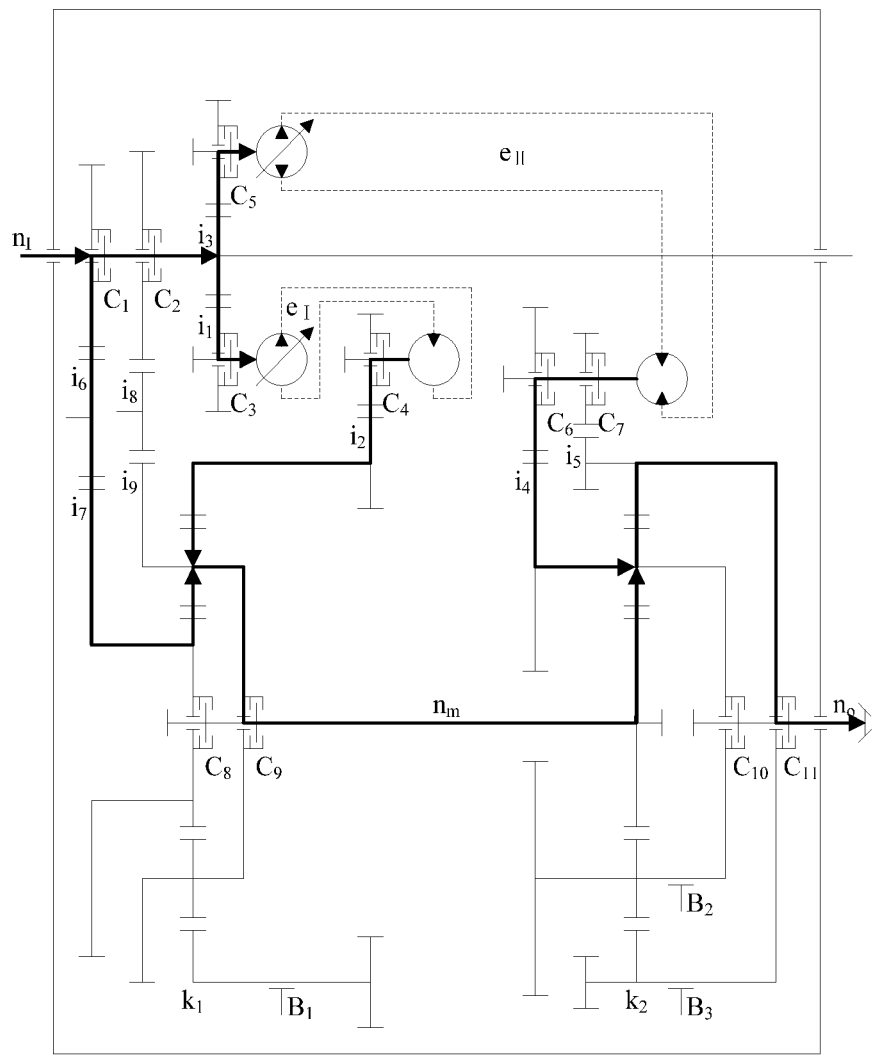
FIG. 14 is a schematic diagram showing the reverse power flow in the hydro-mechanical transmission gear-1 in which the two hydraulic transmission mechanisms participate according to the present invention.

The dual hydro-mechanical transmission reverse gear-1, that is, $R_{I\text{-}II\text{-}1}(HM)$, is shown in FIG. 14, wherein the clutch $C_1$ 23, the clutch $C_3$ 61, the clutch $C_4$ 66, the clutch $C_5$ 32, the clutch $C_6$ 37, the clutch $C_9$ 85, and the clutch $C_{11}$ 45 are engaged. The engine power is split at the input shaft 1 into three parts. A first part of the power is transmitted through the mechanical transmission mechanism-front gear pair 21 to the front planetary gear mechanism-sun gear 81. A second part of the power is transmitted through the first hydraulic transmission mechanism 6 to the front planetary gear mechanism-ring gear 83. The hybrid power is transmitted through the front planetary gear mechanism-planet carrier 82 and the jackshaft 7 to the rear planetary gear mechanism-sun gear 43 and is again converged at the rear planetary gear mechanism-ring gear 41 with a third part of the power that is the hydraulic power transmitted through the second hydraulic transmission mechanism 3 to the rear planetary gear mechanism-planet carrier 42. Then, the power is output from the output shaft 5. In this case, $e_{II} \in [-1, 0]$ in the reverse hydro-mechanical transmission in which the two transmission mechanisms participate, and the output shaft 5 and the input shaft 1 rotate in opposite directions, which is expressed by the following formula:

$$n_o = \frac{\frac{(k_2+1)e_{II}}{i_3 i_4} - \frac{\frac{1}{i_6 i_7} + \frac{k_1 e_I}{i_1 i_2}}{k_1 + 1}}{k_2} n_I.$$

Figure 15:
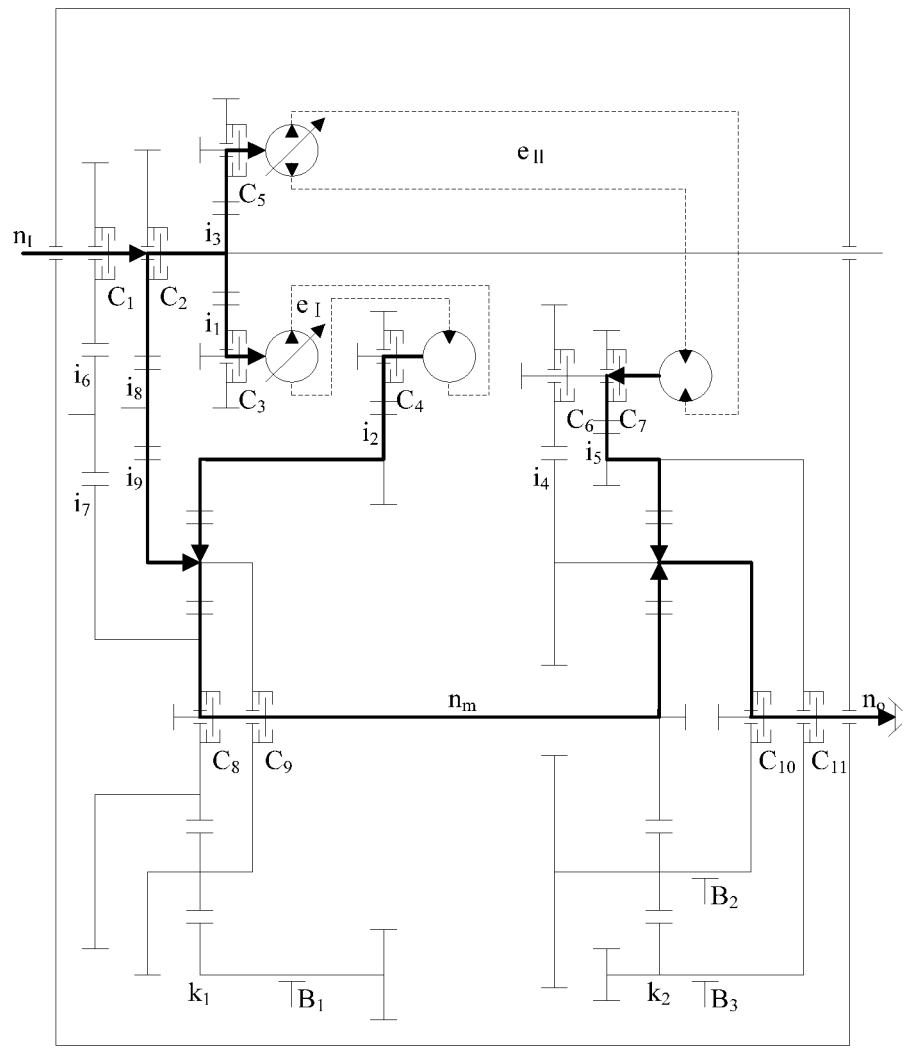
FIG. 15 is a schematic diagram showing the forward power flow in the hydro-mechanical transmission gear-2 in which the two hydraulic transmission mechanisms participate according to the present invention.

The dual hydro-mechanical transmission forward gear-2, that is, $F_{I\text{-}II\text{-}2}(HM)$, is shown in FIG. 15, wherein the clutch $C_2$ 24, the clutch $C_3$ 61, the clutch $C_4$ 66, the clutch $C_5$ 32, the clutch $C_7$ 38, the clutch $C_8$ 84, and the clutch $C_{10}$ 44 are engaged. The engine power is split at the input shaft 1 into three parts. A first part of the power is transmitted through the mechanical transmission mechanism-rear gear pair 22 to the front planetary gear mechanism-planet carrier 82. A second part of the power is transmitted through the first hydraulic transmission mechanism 6 to the front planetary gear mechanism-ring gear 83. The hybrid power is transmitted through the front planetary gear mechanism-sun gear 81 and the jackshaft 7 to the rear planetary gear mechanism-sun gear 43 and is again converged at the rear planetary gear mechanism-planet carrier 42 with a third part of the power that is the hydraulic power transmitted through the second hydraulic transmission mechanism 3 to the rear planetary gear mechanism-ring gear 41. Then, the power is output from the output shaft 5. In this case, $e_{II} \in [0, 1]$ in the forward hydro-mechanical transmission in which the two transmission mechanisms participate, and the output shaft 5 and the input shaft 1 rotate in the same direction, which is expressed by the following formula:

$$n_o = \frac{\left(\frac{k_1+1}{i_8 i_9} - \frac{k_1 e_I}{i_1 i_2}\right) + \frac{k_2 e_{II}}{i_3 i_5}}{k_2 + 1} n_I.$$

Figure 16:
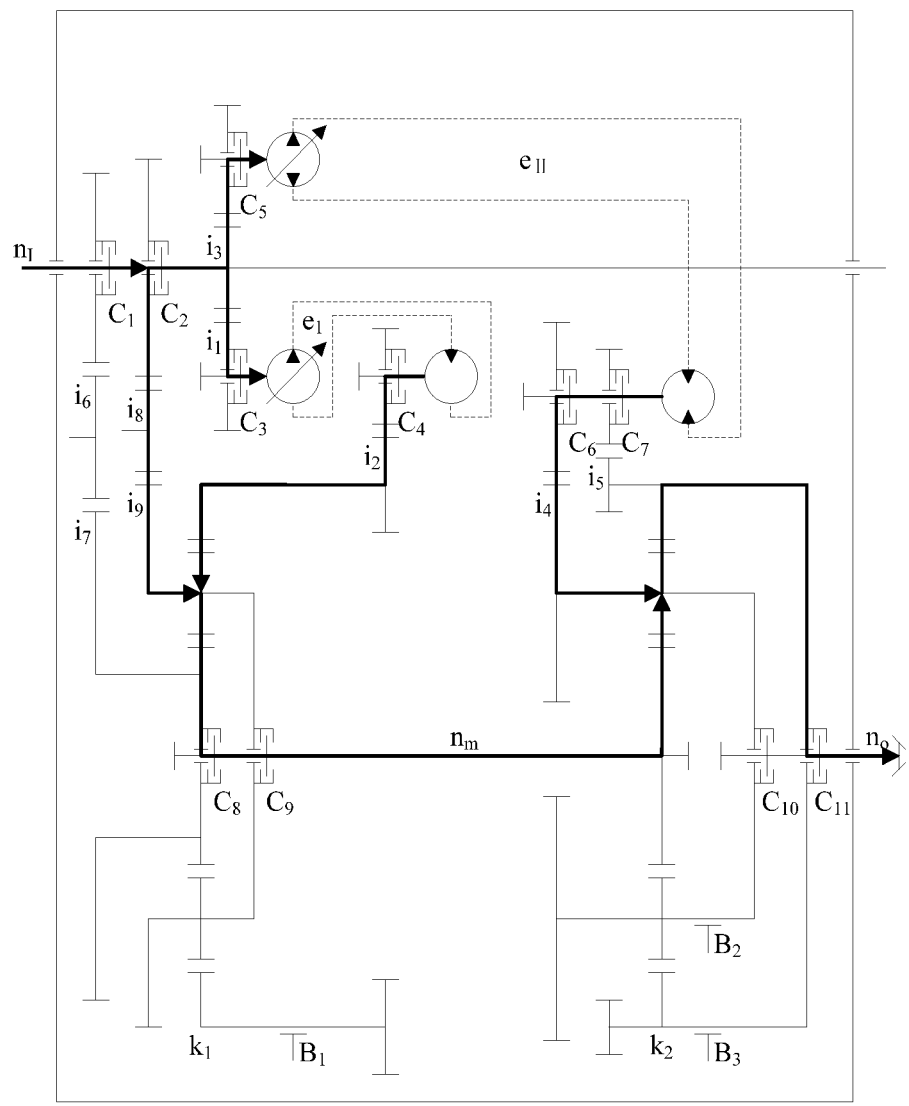
FIG. 16 is a schematic diagram showing the reverse power flow in the hydro-mechanical transmission gear-2 in which the two hydraulic transmission mechanisms participate according to the present invention.

The dual hydro-mechanical transmission reverse gear-2, that is, $R_{I\text{-}II\text{-}2}(HM)$, is shown in FIG. 16, wherein the clutch $C_2$ 24, the clutch $C_3$ 61, the clutch $C_4$ 66, the clutch $C_5$ 32, the clutch $C_6$ 37, the clutch $C_8$ 84, and the clutch $C_{11}$ 45 are engaged. The engine power is split at the input shaft 1 into three parts. A first part of the power is transmitted through the mechanical transmission mechanism-rear gear pair 22 to the front planetary gear mechanism-planet carrier 82. A second part of the power is transmitted through the first hydraulic transmission mechanism 6 to the front planetary gear mechanism-ring gear 83. The hybrid power is transmitted through the front planetary gear mechanism-sun gear 81 and the jackshaft 7 to the rear planetary gear mechanism-sun gear 43 and is again converged at the rear planetary gear mechanism-ring gear 41 with a third part of the power that is the hydraulic power transmitted through the second hydraulic transmission mechanism 3 to the rear planetary gear mechanism-planet carrier 42. Then, the power is output from the output shaft 5. In this case, $e_{II} \in [-1, 0]$ in the reverse hydro-mechanical transmission in which the two transmission mechanisms participate, and the output shaft 5 and the input shaft 1 rotate in opposite directions, which is expressed by the following formula:

$$n_o = \frac{\left(\frac{k_1 e_I}{i_1 i_2} - \frac{k_1+1}{i_8 i_9}\right) + \frac{(k_2+1)e_{II}}{i_3 i_4}}{k_2} n_I.$$

The hydro-mechanical hybrid transmission device with two hydraulic transmission mechanisms of the present invention can switch between the above modes.

The following main parameters are determined: $i_1 i_2 = 1.0$, $i_3 i_4 = i_3 i_5 = 1.0$, $i_6 i_7 = 1.0$, $i_8 i_9 = 1.6$, $k_1 = 1.56$, and $k_2 = 1.5$.

FIG. 17 to FIG. 20 show relationships between output-input speed ratios and displacement ratios of the transmission device, wherein the output shaft can be connected to a speed reducer to drive a vehicle to move.

Figure 17:
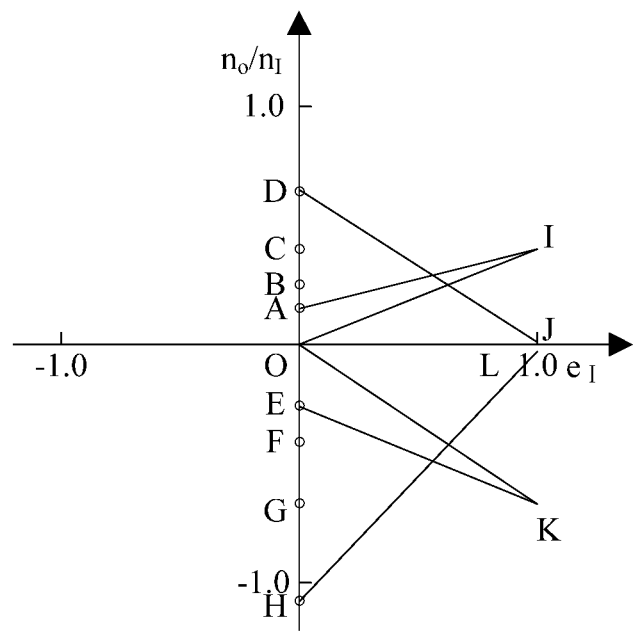
FIG. 17 shows characteristic curves of speed regulation in hybrid transmission in which the first hydraulic transmission mechanism participates according to the present invention.

As shown in FIG. 17, O is the origin;

A (0, 0.16) is a positive feature point in the mechanical gear-1, that is, $n_o = 0.16 n_I$;

B (0, 0.25) is a positive feature point in the mechanical gear-2, that is, $n_o = 0.25 n_I$;

C (0, 0.40) is a positive feature point in the mechanical gear-3, that is, $n_o = 0.40 n_I$;

D (0, 0.64) is a positive feature point in the mechanical gear-4, that is, $n_o = 0.64 n_I$;

E (0, −0.26) is a negative feature point in the mechanical gear-1, that is, $n_o = -0.26 n_I$;

F (0, −0.42) is a negative feature point in the mechanical gear-2, that is, $n_o = -0.42 n_I$;

G (0, −0.67) is a negative feature point in the mechanical gear-3, that is, $n_o = -0.67\ n_I$;

H (0, −1.07) is a negative feature point in the mechanical gear-4, that is, $n_o = -1.07\ n_I$.

OI is a characteristic curve in the $F_I$(H) gear, that is, $n_o = 0.4 n_I e_I$; I (1.00, 0.40);

AI is a characteristic curve in the $F_{I\text{-}1}$(HM) gear, that is, $n_o = (0.24 e_I + 0.16) n_I$;

DJ is a characteristic curve in the $F_{I\text{-}2}$(HM) gear, that is, $n_0 = (-0.62 e_I + 0.64) n_I$; J (1.00, 0.02);

OI intersects with AI at a point (1.00, 0.40), OI intersects with DJ at a point (0.63, 0.25), and AI intersects with DJ at a point (0.56, 0.29);

when $e_I = 1.00$, stepless switching can be implemented between the $F_I$(H) gear and the $F_{I\text{-}1}$(HM) gear;

when $e_I = 0.63$, stepless switching can be implemented between the $F_I$(H) gear and the $F_{I\text{-}2}$(HM) gear;

when $e_I = 0.56$, stepless switching can be implemented between the $F_{I\text{-}1}$(HM) gear and the $F_{I\text{-}2}$(HM) gear.

OK is a characteristic curve in the $R_I$(H) gear, that is, $n_0 = -0.67\ e_I n_I$; K (1.00, −0.67);

EK is a characteristic curve in the $R_{I\text{-}1}$(HM) gear, that is, $n_o = -(0.41 e_I + 0.26) n_I$;

HL is a characteristic curve in the $R_{I\text{-}2}$(HM) gear, that is, $n_o = (1.04 e_I - 1.07) n_I$; L (1.00, −0.03);

OK intersects with EK at a point (1.00, −0.67), OK intersects with HL at a point (0.63, −0.42), and EK intersects with HL at a point (0.56, −0.49);

when $e_I = 1.00$, stepless switching can be implemented between the $R_I$(H) gear and the $R_{I\text{-}1}$(HM) gear;

when $e_I = 0.63$, stepless switching can be implemented between the $R_I$(H) gear and the $R_{I\text{-}2}$(HM) gear;

when $e_I = 0.56$, stepless switching can be implemented between the $R_{I\text{-}1}$(HM) gear and the $R_{I\text{-}2}$(HM) gear.

Figure 18:
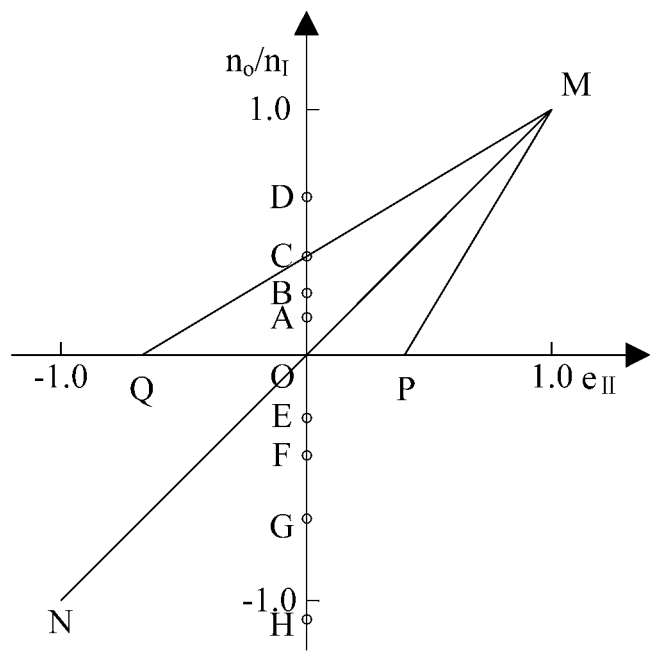
FIG. 18 shows characteristic curves of speed regulation in hybrid transmission in which the second hydraulic transmission mechanism participates according to the present invention.

As shown in FIG. 18,

OM is a characteristic curve in the $F_{II}$(H) gear, that is, $n_o = e_{II} n_I$, $e_{II} \in [0, 1]$; M (1.00, 1.00);

PM is a characteristic curve in the $F_{II\text{-}1}$(HM) gear, that is, $n_o = (0.60 e_{II} + 0.40) n_I$, $e_{II} \in [0.40, 1.00]$; P (0, 0.40);

QM is a characteristic curve in the $F_{II\text{-}2}$(HM) gear, that is, $n_o = (1.67 e_{II} - 0.67) n_I$, $e_{II} \in [-0.67, 1.00]$; Q (0, −0.67);

when $e_{II} = 1.00$, stepless switching can be implemented between the $F_{II}$(H) gear, the $F_{II\text{-}1}$(HM) gear, and the $F_{II\text{-}2}$(HM) gear.

Figure 19:
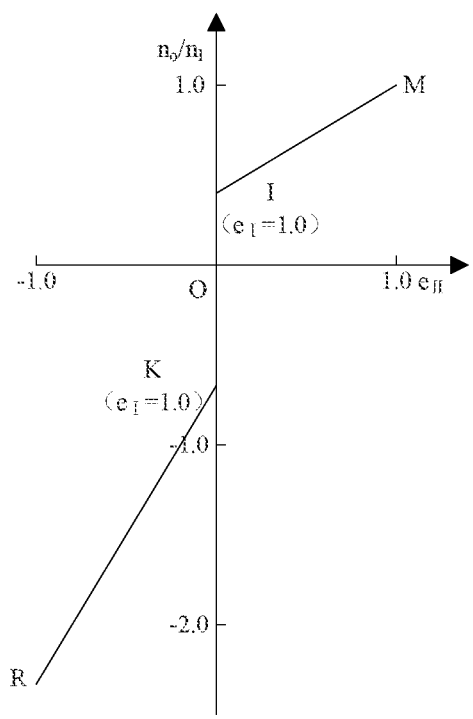
FIG. 19 shows characteristic curves of speed regulation in the hydro-mechanical transmission gear-1 in which the two hydraulic transmission mechanisms participate according to the present invention.

As shown in FIG. 19, the characteristic curve in the $F_{I\text{-}1}$(HM) gear is: $n_o = (0.24 e_I + 0.16) n_I$;

when $e_I \in [0, 1]$, the speed regulation range is $n_o \in [0.16, 0.40] n_I$;

the characteristic curve in the $F_{I\text{-}II\text{-}1}$(HM) gear is: $n_o = (0.24 e_I + 0.16 + 0.6 e_{II}) n_I$;

when $e_I = 1.00$ and $e_{II} \in [0, 1]$, the speed regulation range in the $F_{I\text{-}II\text{-}1}$(HM) gear is $n_o \in [0.40, 1.00] n_I$;

the characteristic curve in the $R_{I\text{-}1}$(HM) gear is: $n_o = -(0.41 e_I + 0.26) n_I$;

when $e_I \in [0, 1]$, the speed regulation range is $n_o \in [-0.67, -0.26] n_I$;

the characteristic curve in the $R_{I\text{-}II\text{-}1}$(HM) gear is: $n_o = -(0.41 e_I + 0.26 - 1.67 e_{II}) n_I$;

when $e_I = 1.00$ and $e_{II} \in [-1, 0]$, the speed regulation range in the $R_{I\text{-}II\text{-}1}$(HM) gear is $n_o \in [-2.34, -0.67] n_I$; R (−1.00, −2.34).

Figure 20:
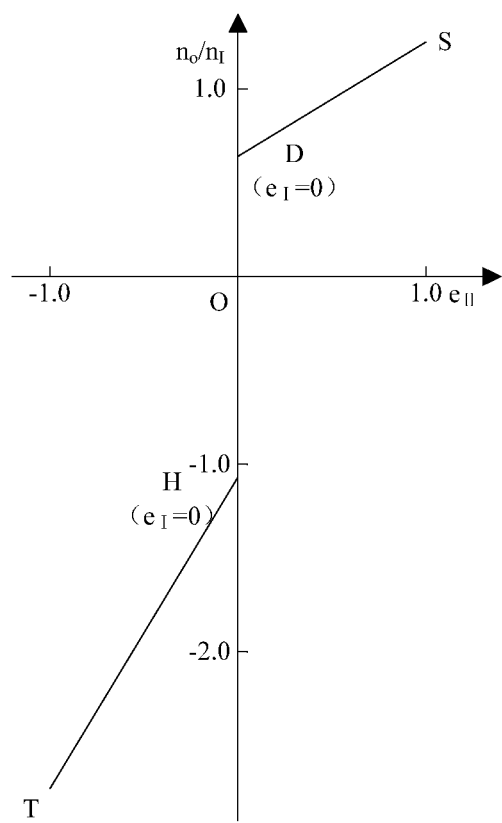
FIG. 20 shows characteristic curves of speed regulation in the hydro-mechanical transmission gear-2 in which the two hydraulic transmission mechanisms participate according to the present invention.

As shown in FIG. 20, the characteristic curve in the $F_{I\text{-}2}$(HM) gear is: $n_o = (-0.62 e_I + 0.64) n_I$;

when $e_I \in [0, 1]$, the speed regulation range is $n_o \in [0.02, 0.64] n_I$;

the characteristic curve in the $F_{I\text{-}II\text{-}2}$(HM) gear is: $n_o = (-0.62 e_I + 0.64 + 0.60 e_{II}) n_I$;

when $e_I = 0$ and $e_{II} \in [0, 1]$, the speed regulation range in the $F_{I\text{-}II\text{-}2}$(HM) gear is $n_o \in [0.64, 1.24] n_I$; S (1.00, 1.24);

the characteristic curve in the $R_{I\text{-}2}$(HM) gear is: $n_o = (1.04 e_I - 1.07) n_I$;

when $e_I \in [0, 1]$, the speed regulation range is $n_o \in [-1.07, -0.03] n_I$;

the characteristic curve in the $R_{I\text{-}II\text{-}2}$(HM) gear is: $n_o = (1.04 e_I - 1.07 + 1.67 e_{II}) n_I$;

when $e_I = 0$ and $e_{II} \in [-1, 0]$, the speed regulation range in the $R_{I\text{-}II\text{-}2}$(HM) gear is $n_o$ $[-2.74, -1.07] n_I$; T (−1.00, −2.74).

The above descriptions are preferred embodiments of the present invention, and are not intended to limit the present invention. Any obvious improvements, replacements, or modifications made by persons skilled in the art without departing from the essence of the present invention shall fall within the protection scope of the present invention.

What is claimed is:

1. A hydro-mechanical hybrid transmission device with two hydraulic transmission mechanisms, comprising
    an input member,
    a second hydraulic transmission mechanism,
    a rear planetary gear mechanism,
    an output member,
    a first hydraulic transmission mechanism,
    a front planetary gear mechanism,
    a clutch assembly, and
    a brake assembly, wherein
        the clutch assembly connects the input member to the front planetary gear mechanism, the second hydraulic transmission mechanism, and the first hydraulic transmission mechanism,
        the clutch assembly connects an output end of the first hydraulic transmission mechanism to the front planetary gear mechanism,
        the clutch assembly connects the rear planetary gear mechanism to an output end of the second hydraulic transmission mechanism and the front planetary gear mechanism, and the clutch assembly connects an output end of the rear planetary gear mechanism to the output member; and the clutch assembly and the brake assembly provide a continuous transmission ratio between the input member and the output member.

2. The hydro-mechanical hybrid transmission device with the two hydraulic transmission mechanisms according to claim 1, wherein transmission modes comprising hydraulic transmission, mechanical transmission, single hydro-mechanical transmission, and dual hydro-mechanical transmission are provided between the input member and the output member by adjusting a displacement ratio of the second hydraulic transmission mechanism and/or a displacement ratio of the first hydraulic transmission mechanism and selectively controlling an engagement of the clutch assembly and the brake assembly.

3. The hydro-mechanical hybrid transmission device with the two hydraulic transmission mechanisms according to claim 2, wherein the front planetary gear mechanism comprises a front planetary gear mechanism-sun gear, a front planetary gear mechanism-planet carrier, and a front planetary gear mechanism-ring gear; and the rear planetary gear mechanism comprises a rear planetary gear mechanism-ring gear, a rear planetary gear mechanism-planet carrier, and a rear planetary gear mechanism-sun gear;

the clutch assembly comprises a first clutch, a second clutch, a third clutch, a fourth clutch, a fifth clutch, a sixth clutch, a seventh clutch, an eighth clutch, a ninth clutch, a tenth clutch, and an eleventh clutch, wherein the first clutch is used for selectively connecting the input member to the front planetary gear mechanism-sun gear to implement a first synchronous rotation, the second clutch is used for selectively connecting the input member to the front planetary gear mechanism-planet carrier to implement a second synchronous rotation, the third clutch is used for selectively connecting the input member to an input end of the first hydraulic transmission mechanism to implement a third synchronous rotation, the fourth clutch is used for selectively connecting the output end of the first hydraulic transmission mechanism to the front planetary gear mechanism-ring gear to implement a fourth synchronous rotation, the fifth clutch is used for selectively connecting the input member to an input end of the second hydraulic transmission mechanism to implement a fifth synchronous rotation, the sixth clutch is used for selectively connecting the output end of the second hydraulic transmission mechanism to the rear planetary gear mechanism-planet carrier to implement a sixth synchronous rotation, the seventh clutch is used for selectively connecting the output end of the second hydraulic transmission mechanism to the rear planetary gear mechanism-ring gear to implement a seventh synchronous rotation, the eighth clutch is used for selectively connecting the front planetary gear mechanism-sun gear to the rear planetary gear mechanism-sun gear to implement an eighth synchronous rotation, the ninth clutch is used for selectively connecting the front planetary gear mechanism-planet carrier to the rear planetary gear mechanism-sun gear to implement a ninth synchronous rotation, the tenth clutch is used for selectively connecting the rear planetary gear mechanism-planet carrier to the output member to implement a tenth synchronous rotation, and the eleventh clutch is used for selectively connecting the rear planetary gear mechanism-ring gear to the output member to implement an eleventh synchronous rotation;

the brake assembly comprises a first brake, a second brake, and a third brake, wherein the first brake is used for selectively fixing the front planetary gear mechanism-ring gear;

the second brake is used for selectively fixing the rear planetary gear mechanism-planet carrier; and the third brake is used for selectively fixing the rear planetary gear mechanism-ring gear.

4. The hydro-mechanical hybrid transmission device with the two hydraulic transmission mechanisms according to claim 3, wherein first forward or reverse hydraulic transmission is provided between the input member and the output member by adjusting the displacement ratio of the first hydraulic transmission mechanism, engaging the third clutch, the fourth clutch, the eighth clutch, and the ninth clutch, and selectively engaging the tenth clutch and the third brake or selectively engaging the eleventh clutch and the second brake;

second forward or reverse hydraulic transmission is provided between the input member and the output member by adjusting the displacement ratio of the second hydraulic transmission mechanism, engaging the fifth clutch, the seventh clutch, and the eleventh clutch, or engaging the fifth clutch, the sixth clutch, and the tenth clutch.

5. The hydro-mechanical hybrid transmission device with the two hydraulic transmission mechanisms according to claim 3, wherein different forward mechanical transmissions are provided between the input member and the output member by engaging the tenth clutch and the third brake, selectively engaging the first clutch, the ninth clutch, and the first brake, or selectively engaging the second clutch and the ninth clutch, or selectively engaging the first clutch and the eighth clutch, or selectively engaging the second clutch, the eighth clutch $C_8$ (84), and the first brake.

6. The hydro-mechanical hybrid transmission device with the two hydraulic transmission mechanisms according to claim 3, wherein different reverse mechanical transmissions are provided between the input member and the output member by engaging the eleventh clutch and the second brake, selectively engaging the first clutch, the ninth clutch, and the first brake, or selectively engaging the second clutch and the ninth clutch, or selectively engaging the first clutch and the eighth clutch, or selectively engaging the second clutch, the eighth clutch, and the first brake.

7. The hydro-mechanical hybrid transmission device with the two hydraulic transmission mechanisms according to claim 3, wherein different first forward single hydro-mechanical transmissions are provided between the input member and the output member by adjusting the displacement ratio of the first hydraulic transmission mechanism, engaging the third clutch, the fourth clutch, the tenth clutch, and the third brake, and selectively engaging the first clutch and the ninth clutch or selectively engaging the second clutch and the eighth clutch;

different first reverse single hydro-mechanical transmissions are provided between the input member and the output member by adjusting the displacement ratio of the first hydraulic transmission mechanism, engaging the third clutch, the fourth clutch, the eleventh clutch, and the second brake, and selectively engaging the first clutch and the ninth clutch or selectively engaging the second clutch and the eighth clutch.

8. The hydro-mechanical hybrid transmission device with the two hydraulic transmission mechanisms according to claim 3, wherein second forward or reverse single hydro-mechanical transmission is provided between the input member and the output member by adjusting the displacement ratio of the second hydraulic transmission mechanism, engaging the first clutch, the fifth clutch, and the eighth clutch, and selectively engaging the seventh clutch and the tenth clutch or selectively engaging the sixth clutch and the eleventh clutch.

9. The hydro-mechanical hybrid transmission device with the two hydraulic transmission mechanisms according to claim 3, wherein different forward dual hydro-mechanical transmissions are provided between the input member and the output member by adjusting the displacement ratio of the first hydraulic transmission mechanism and the displacement ratio of the second hydraulic transmission mechanism, engaging the third clutch, the fourth clutch, the fifth clutch, the seventh clutch, and the tenth clutch, and selectively engaging the first clutch and the ninth clutch or selectively engaging the second clutch and the eighth clutch;

different reverse dual hydro-mechanical transmissions are provided between the input member and the output member by adjusting the displacement ratio of the first hydraulic transmission mechanism and the displacement ratio of the second hydraulic transmission mechanism, engaging the third clutch, the fourth clutch, the fifth clutch, the sixth clutch, and the eleventh clutch, and selectively engaging the first clutch and the ninth clutch or selectively engaging the second clutch and the eighth clutch.

10. The hydro-mechanical hybrid transmission device with the two hydraulic transmission mechanisms according to claim 3, wherein the hydraulic transmission is configured to be switched to the single hydro-mechanical transmission in a stepless manner; and the single hydro-mechanical transmission is configured to be switched to the dual hydro-mechanical transmission in the stepless manner.

* * * * *